(12) United States Patent
McBrien et al.

(10) Patent No.: US 6,341,031 B1
(45) Date of Patent: Jan. 22, 2002

(54) OPTICAL PULSE GENERATION USING A HIGH ORDER FUNCTION WAVEGUIDE INTERFEROMETER

(75) Inventors: Gregory J. McBrien, Cromwell; Karl M. Kissa, Simsbury; Peter Hallemeier, Meriden; Thomas Joseph Gryk, Windham, all of CT (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/428,969

(22) Filed: Nov. 4, 1999

Related U.S. Application Data
(60) Provisional application No. 60/136,196, filed on May 25, 1999.

(51) Int. Cl.[7] ............................. G02F 1/00; G02F 1/035
(52) U.S. Cl. .................................. 359/237; 385/3; 385/9
(58) Field of Search .................................. 359/237, 239, 359/245; 356/345; 385/3, 8, 9

(56) References Cited

U.S. PATENT DOCUMENTS

| | | | |
|---|---|---|---|
| 5,101,450 A | | 3/1992 | Olshansky ...................... 385/3 |
| 5,148,503 A | | 9/1992 | Skeie ............................. 385/3 |
| 5,239,401 A | | 8/1993 | Olshansky ................... 359/188 |
| 5,249,243 A | | 9/1993 | Skeie ............................. 385/3 |
| 5,710,653 A | * | 1/1998 | Nemecek et al. ............ 359/187 |
| 5,802,222 A | * | 9/1998 | Rasch et al. ..................... 385/9 |
| 5,835,212 A | | 11/1998 | Kissa et al. .................. 356/345 |
| 5,932,155 A | * | 11/1998 | Rasch et al. ..................... 385/9 |
| 5,875,048 A | | 2/1999 | Nemecek et al. ............ 359/187 |

OTHER PUBLICATIONS

B. Mikkelsen et al., "A ll–Optical Wavelength Converter Scheme for High Speed RZ Signal Formats" *Electronic Letters* 33(25):2137–2139 (1997).
Eric A. Swanson et al., "40–GH z Pulse Train Generation Using Soliton Compression of a Mach–Zehnder Modulator Output" *IEEE Photonics Tech. Letters* 7(1):114–116 (1995).
M. Izutsu et al., "Integrated Optical SSB Modulator/Frequency Shifter" *IEEE J. of Quantum Electronics* QE–17(11):2225–2227 (1981).
Y. Wang–Boulic, "A Linearized Optical Modulator for Reducing Third–Order Intermodulation Distortion" *J. Lightwave Tech.* 10(8):1066–1069 (1992).

* cited by examiner

*Primary Examiner*—Huy Mai
(74) *Attorney, Agent, or Firm*—Rauschenbach Patent Law Group

(57) ABSTRACT

An optical pulse generator having a high order transfer function that comprises a first and a second nested interferometric modulator, each modulator comprising an optical input, an electrical input, a first arm, a second arm and an optical output. The second interferometric modulator is optically coupled into the second arm of the first interferometric modulator. The optical output of the first interferometric modulator generates pulses at a repetition rate that is proportional to a multiple of a frequency of an electrical signal applied to the electrical input of at least one of the first and second interferometric modulator and at a duty cycle that is inversely proportional to the order of the transfer function of the optical pulse generator. The multiple may be any integer equal to or greater than one.

20 Claims, 16 Drawing Sheets

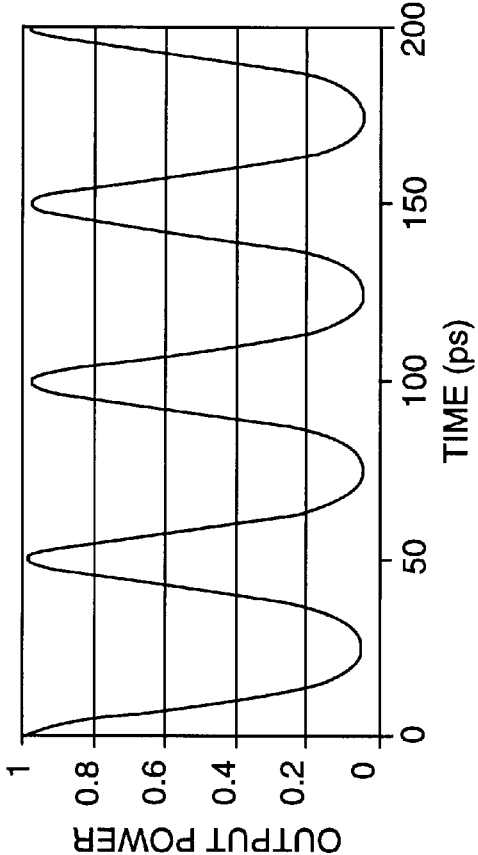
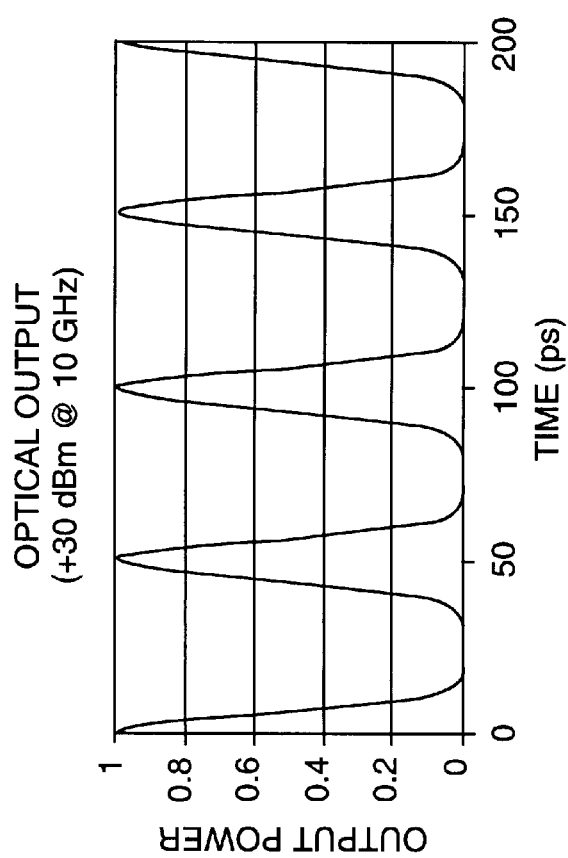

OPTICAL PULSE GENERATION USING A HIGH ORDER FUNCTION WAVEGUIDE INTERFEROMETER

RELATED APPLICATIONS

This application claims the benefit of U.S. Provisional Application Serial No. 60/136,196, filed May 25, 1999.

FIELD OF THE INVENTION

The invention relates generally to the field of optical pulse generation. In particular, the invention relates to apparatus for narrow pulse generation and methods of generating narrow pulses.

BACKGROUND OF THE INVENTION

Narrow optical pulse generation is required for numerous communications and sensor systems. Narrow optical pulses are optical pulses that occupy small intervals of time or optical pulses that have a steep intensity change produced by a control signal. In telecommunications systems, for example, the transmission of optical pulses is used when the modulation format requires that the intensity change from off to on, and then off again within a bit time period. This produces pulses of light, which comprise clocking or data signals.

Return-to-Zero (RZ) data refers to data which is either off or on for approximately half the bit period. Non-Return-to-Zero (NRZ) data refers to data where the light is on or off for the whole bit period. FIG. 1 illustrated a prior art timing diagram 10 of Clock 12, NRZ data 14, and RZ data format 16. Typically, these data formats can be constructed in the electrical system by using a logical "and ing" between the data clock and the data itself.

At high data rates, it is difficult to generate pulses electrically with prior art optical modulators. It is also difficult to generate pulses having a predetermined shape for the specific application such as soliton and other narrow optical pulse formats for very long distance propagation.

There exists several prior art pulse generators for generating narrow and predetermined pulse formats that comprise cascaded replications of Mach-Zehnder interferometers. These prior art devices use separately fed controlling sections. The input signals and operating bias state of the aggregate device is controlled in a variety of ways depending on the design. Some of these designs use modified input signals to each section of the aggregate device to produce the desired pulse train. Other prior art methods partially modulate the transfer function of a modulator with a device, such as an electro-absorption modulator, in order to generate fast pulses.

There are numerous disadvantages of these prior art designs. For example, these methods require precise control of the time delay and phase of the different input signals, which is both difficult and costly to achieve. Also, there is a relatively high power penalty associated with generating a number of high-speed signals and associated with the additional physical length required for the device.

There exists a need for an apparatus and method for generating narrow RZ pulses for modern communications systems. There also exists a need for generating pulses with a very narrow width that can be transmitted over long distances. There also is a need for an apparatus and method for generating a Gaussian, or hyperbolic secant squared shape pulse at high speeds, which is the algebraic shape required for soliton pulse generation.

SUMMARY OF THE INVENTION

The present invention relates to a pulse generator comprising a high order function waveguide interferometer that generates narrow pulses and pulses having a predetermined shape for specific applications such as soliton and other narrow optical pulse formats. A principal discovery of the present invention is that nested and parallel configurations of interferometric modulators can be used to generate narrow pulses and pulsing having a predetermined shape for specific applications.

Accordingly, the present invention features an optical pulse generator having a high order transfer function. In one embodiment, the optical pulse generator includes a first and a second nested interferometric modulator, each modulator comprising an optical input, an electrical input, a first arm, a second arm and an optical output. The second interferometric modulator is optically coupled into the second arm of the first interferometric modulator. The optical output of the first interferometric modulator generates pulses at a repetition rate that is proportional to a multiple of a frequency of an electrical signal applied to the electrical input of at least one of the first and second interferometric modulator and at a duty cycle that is inversely proportional to the order of the transfer function of the optical pulse generator. The duty cycle may be inversely non-linearly monotonically proportional to the order of the transfer function of the optical pulse generator. The multiple may be any integer equal to or greater than one. A phase modulator may be coupled in series with the output of the first interferometric modulator to chirp the optical pulses with a modulation signal applied to an electrical input of the phase modulator.

In one embodiment of the invention, the pulse generator also includes a third interferometric modulator comprising a first and second arm and an electrical input. The third interferometric modulator has an input optically coupled to the output of the first interferometric modulator. The pulse generator of this embodiment also includes a fourth interferometric modulator comprising a first and second arm and an electrical input. The fourth interferometric modulator is optically coupled into the second arm of the third interferometric modulator. The optical output of the third interferometric modulator generates pulses at a repetition rate that is proportional to a multiple of a frequency of an electrical signal applied to the electrical input of at least one of the second and the fourth interferometric modulator and at a duty cycle that is inversely non-linearly proportional to the order of the transfer function of the optical pulse generator.

The interferometric modulators may be amplitude or phase modulators. In one embodiment, the interferometric modulators are Mach-Zehnder modulators formed on a lithium niobate substrate that may be X-cut or Z-cut. The interferometric modulators may also be substantially velocity matched or substantially temperature compensated.

In one embodiment of the invention, the interferometric modulators are narrow band modulators. That is, the bandwidth of the modulators is substantially limited to a predetermined bandwidth. Using narrow band modulators may increase the efficiency of the optical pulse generation. In one embodiment, the splitting ratio between the first and the second arm of at least one interferometric modulator is substantially less than one.

The present invention also features an optical pulse generator having a high order transfer function that comprises a plurality of interferometric modulators optically connected in parallel. Each of the plurality of interferometric modulators includes a first and second arm and an electrical input.

The optical pulse generator having even order transfer functions includes an optical waveguide that is optically coupled in parallel with the plurality of interferometric modulators. An optical output generates optical pulses having a repetition rate that is proportional to a multiple of a frequency of an electrical signal applied to the electrical input of at least one of the plurality of interferometric modulators and having a duty cycle that is inversely non-linearly proportional to the order of the transfer function of the optical pulse generator. The multiple may be any integer equal to or greater than one.

The output waveguide of at least one of the plurality of interferometric modulators may include a bias electrode, wherein a voltage applied to the bias electrode modifies a phase of an optical signal propagating from the at least one of the plurality of interferometric modulators. In addition, a phase modulator may be coupled in series with the output of the first interferometric modulator to chirp the optical pulses with a modulation signal applied to an electrical input of the phase modulator.

The present invention also features a method for generating optical pulses with a high order nested interferometric modulator. The method may generate narrow pulses and pulses having a predetermined shape for specific applications such as soliton and other narrow optical pulse formats. The method includes receiving an input optical beam and splitting the beam into a first and second optical beam. A material propagating the first optical beam is electro-optically biased, thereby changing a characteristic of the first optical beam. The electro-optical bias may change the extinction ratio of the pulses.

The second optical beam is split into a third and fourth optical beam. A material propagating at least one of the third and the fourth optical beams is electro-optically biased thereby changing a characteristic of at least one of the third and the fourth optical beams. At least one of the third and fourth optical beams is modulated with an electrical signal. The first, third, and fourth optical beams are interfered to generate optical pulses having a repetition rate that is proportional to a multiple of a frequency of the electrical modulation signal and having a duty cycle that is inversely non-linearly proportional to the order of the nested interferometric modulator.

BRIEF DESCRIPTION OF THE DRAWINGS

This invention is described with particularity in the appended claims. The above and further advantages of this invention may be better understood by referring to the following description taken in conjunction with the accompanying drawings, in which:

FIG. 2b illustrates the transfer function between the applied modulation signal and the output intensity of the prior art modulator of FIG. 2a.

FIG. 15a illustrates the optical output generated by a 2×20Gb/s pulse generator of the present invention for a drive power equal to 30 dBm.

FIG. 15b illustrates the optical output generated by a 2×20Gb/s pulse generator of the present invention for drive power equal to 27 dBm.

DETAILED DESCRIPTION

A pulse generator of the present invention comprises a high order function waveguide interferometer that generates narrow pulses and pulses having a predetermined shape for specific applications such as soliton and other narrow optical pulse formats. There are several prior art devices that use high order function waveguide interferometers. For example, U.S. Pat. No. 5,101,450 to Olshansky describes a parallel configuration of interferometric modulators that is used for canceling second order intermodulation distortion in analog communications systems.

Also, in Yu Wang-Boulic, entitled *A Linearized Optical Modulator for Reducing Third-Order Intermodulation Distortion*, Journal of Lightwave Technology, Vol. 10 No. Aug. 8, (1992), a cascaded configuration of Mach-Zehnder modulators is described for reducing third order intermodulation distortion in analog communication systems. In addition, in Masayuki Izutsu et al., entitled, *Integrated Optical SSB Modulator/Frequency Shifter*, IEEE Journal of Quantum Electronics, Vol. QE-17, No. Nov. 11, (1981), an analog frequency shifter is described that comprises a parallel configuration of interferometric modulators. Prior art devices that use high order function waveguide interferometers have been limited to analog applications.

For chirp free modulation, the modulator transfer function of a high order function waveguide interferometer can be expressed as:

$$E = \left(\frac{e^{j\theta/2} + e^{-j\theta/2}}{2}\right)^N = \cos^N\left(\frac{\theta}{2}\right) \quad (1)$$

where E represents the complex amplitude of the optical E-field, θ represents the applied modulation, and N represents the order. The intensity of the light can be represented by:

$$I = \left(\frac{e^{j\theta/2} + e^{-j\theta/2}}{2}\right)^{2N} = \cos^{2N}\left(\frac{\theta}{2}\right) \quad (2)$$

Figure 1:
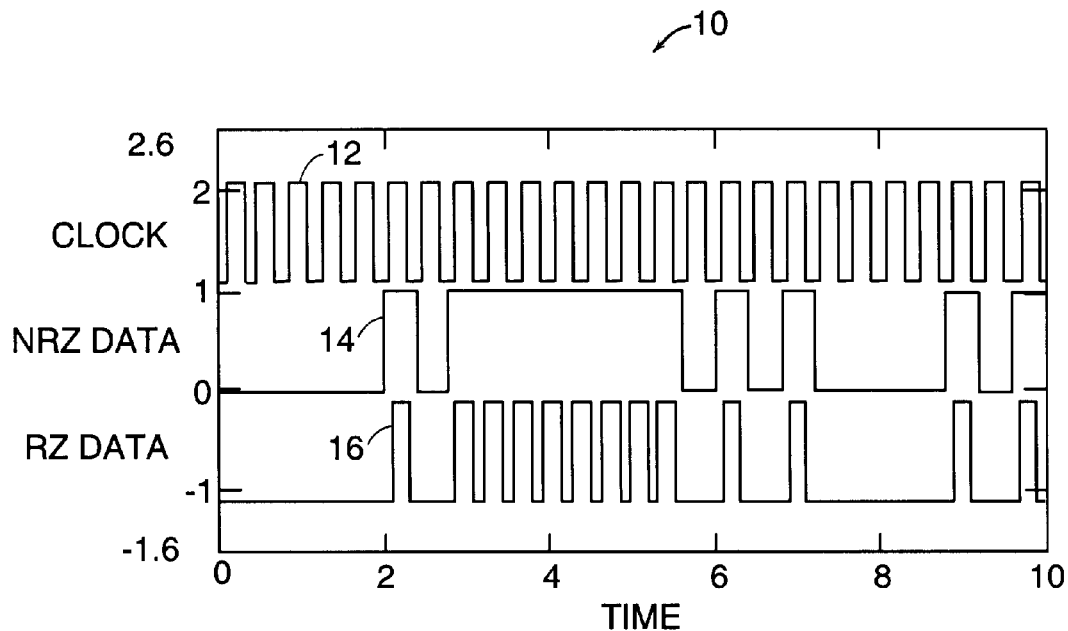
FIG. 1 illustrates a timing diagram of Clock, NRZ data, and RZ data formats known to the prior art.
Figure 2A:
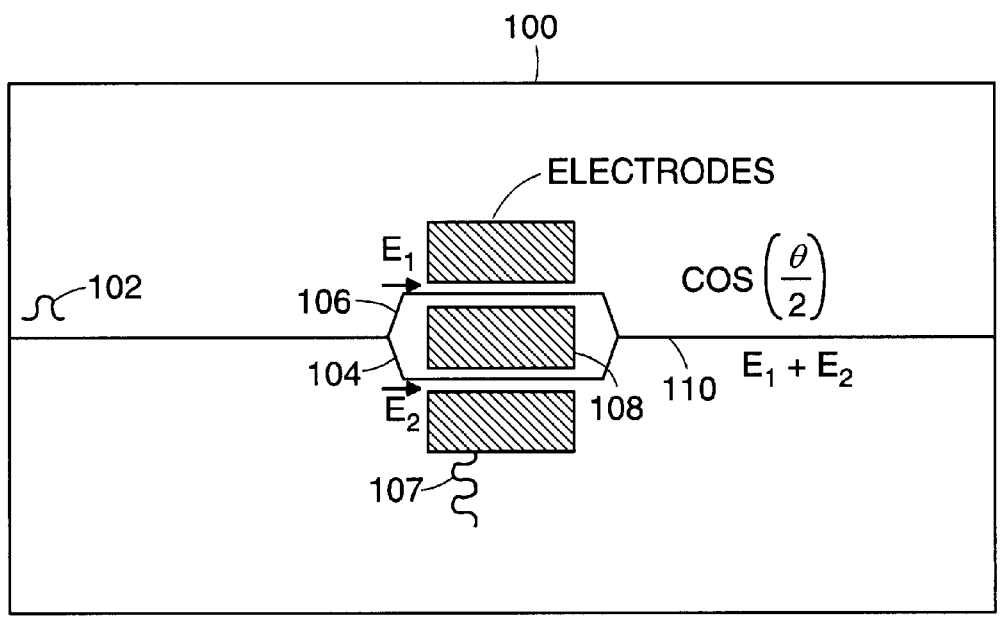
FIG. 2a illustrates a schematic diagram of a Mach-Zehnder interferometer known to the prior art.

FIG. 2a illustrates a schematic diagram of a prior art Mach-Zehnder interferometer (MZI) 100 with order N=1. An input light signal 102 is split into a first waveguide branch 104 and a second waveguide branch 106. A modulation signal 107 is applied to an input electrode 108. The transfer function of the prior art modulator illustrated in FIG. 2a where N=1 can be expressed as:

$$E = \left(\frac{e^{j\theta/2} + e^{-j\theta/2}}{2}\right) = \cos\left(\frac{\theta}{2}\right) \quad (3)$$

The transfer function reduces to cos(θ/2) because there is no chirp or phase shift with modulating and thus, no imaginary component in E that changes with θ.

Figure 2B:
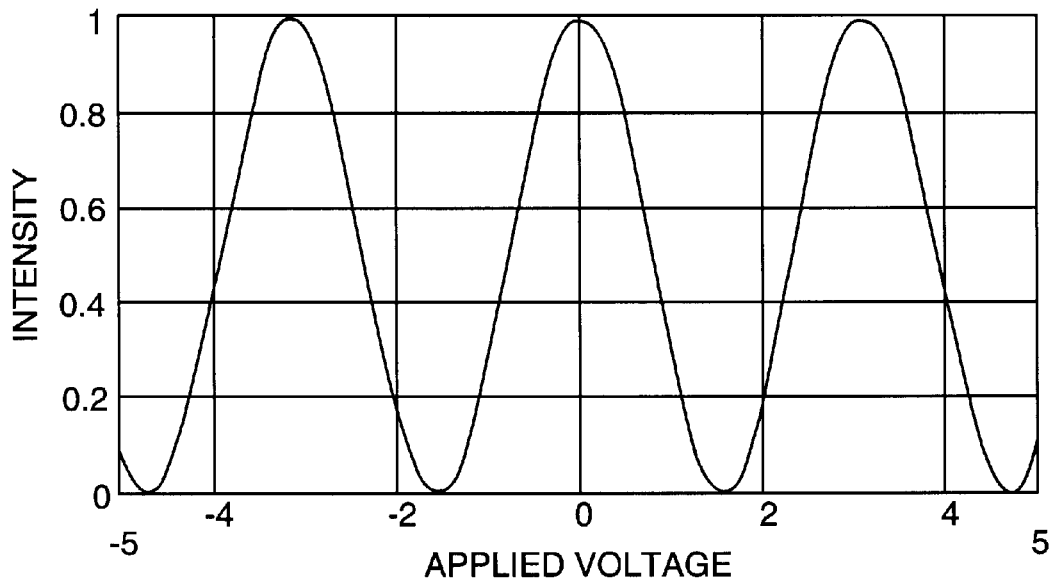

FIG. 2b illustrates a transfer function between the applied modulation signal and the output intensity of the prior art Mach-Zehnder interferometer of FIG. 2a. By modulating the Mach-Zehnder interferometer 100 with a modulation signal having a sinusoidal frequency at the input electrode 108, an output 110 of the interferometer generates output pulses that comprise the combination of the sinewave input signal applied to the cosine wave transfer function of the interferometer 100.

Figure 2C:
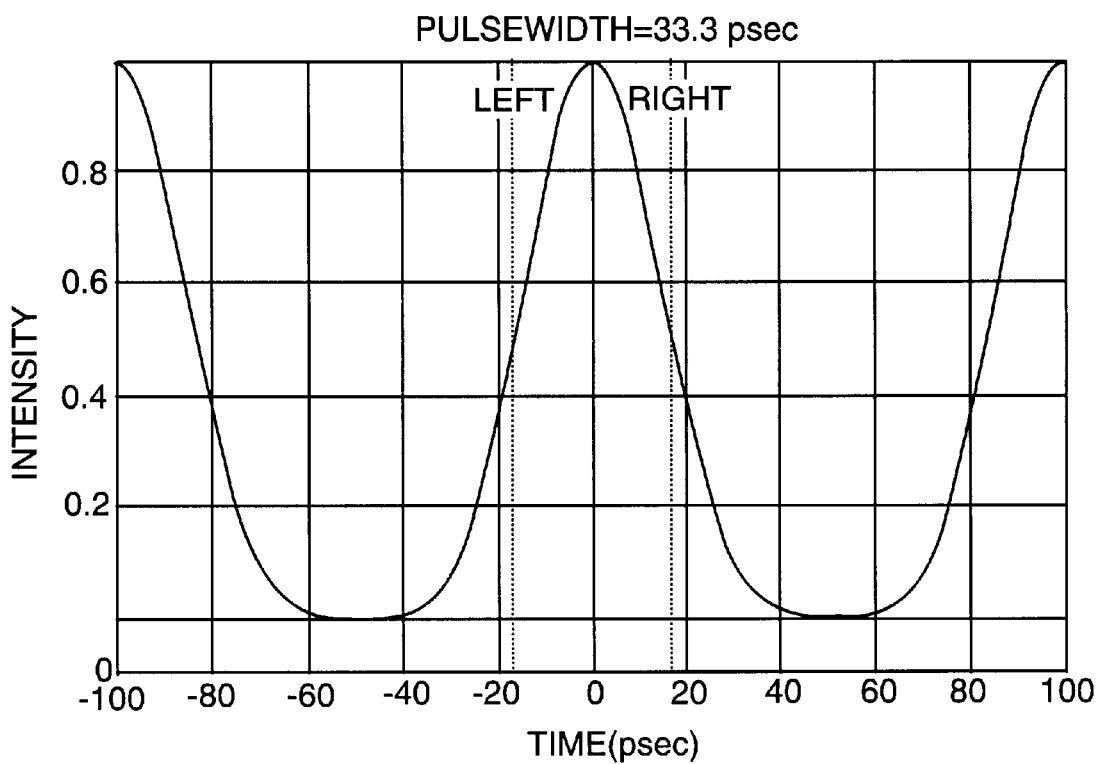
FIG. 2c illustrates a time domain output signal for the Mach-Zehnder interferometer of FIG. 2a with a sinusoidal signal applied to the input electrode.

FIG. 2c illustrates a time domain output signal for the prior art Mach-Zehnder interferometer 100 of FIG. 2a with a sinusoidal modulation signal applied to the input electrode 108. FIG. 2c illustrates the output signal corresponding to a modulation signal applied over 2 Pi radians, which corresponds to a "double sweeping" of the transfer function of the modulator. The modulator 100 is biased so that the intensity is maximized with the modulation signal turned off. The modulation signal sweeps out the transfer function about the intensity maximum. The signal generated has a frequency double that of the modulation signal.

Figure 3:
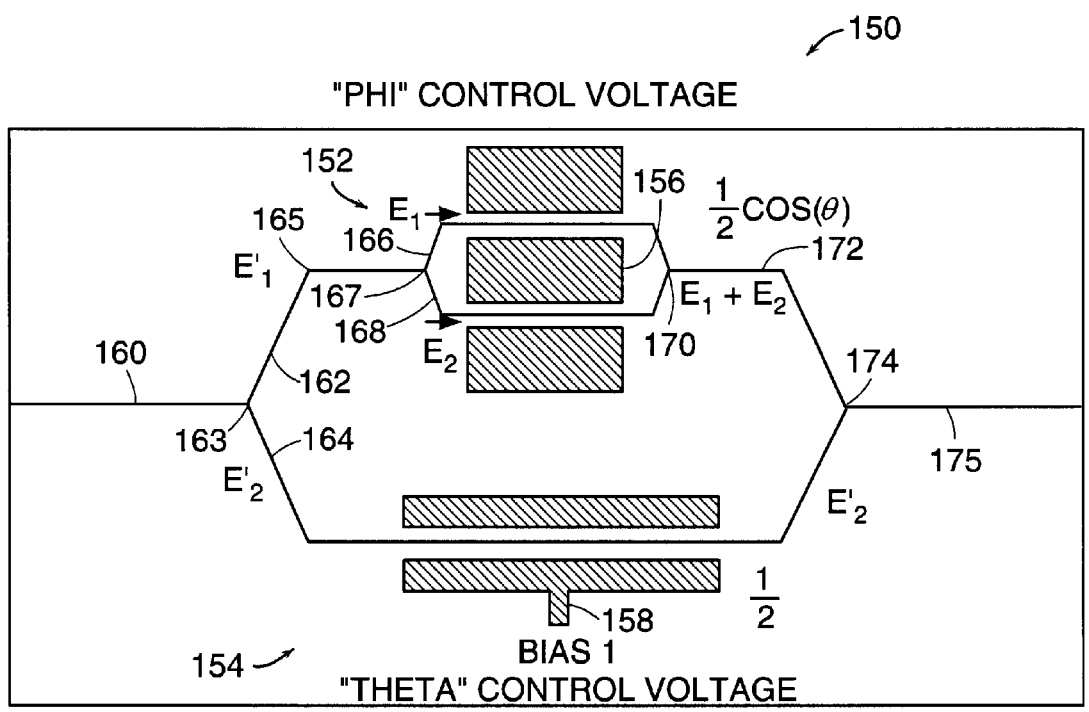
FIG. 3 illustrates an embodiment of a narrow pulse generator using a nested modulator configuration of order N=2 according to the present invention.

FIG. 3 illustrates an embodiment of a pulse generator 150 according to the present invention that comprises a high order function waveguide interferometer. The pulse generator 150 has a fourth order response in intensity vs modulation signal and thus has a significantly "sharper" transfer function than the prior art Mach-Zehnder interferometer of FIG. 2. The pulse generator 150 comprises an outer or first Mach-Zehnder interferometer 154 and an inner or second Mach-Zehnder interferometer 152 in a "nested" configuration. That is, the second interferometric modulator is optically coupled into an arm of the first interferometric modulator. The inner Mach-Zehnder interferometer 152 includes a Phi control voltage electrode 156 for applying a modulation signal. The outer Mach-Zehnder interferometer 154 includes a Theta control voltage electrode or bias electrode 158 for applying a modulation signal or a bias signal.

In one embodiment, metal electrodes are used to provide a means of controlling the static optical phase of the relative arms of the inner Mach-Zehnder interferometer 152 and the outer Mach-Zehnder interferometer 154. The metal electrodes 156 and 158 are also used to provide attenuation for balancing the light in the respective arms to produce the desired extinction of the light in the off state, and the desired light output in the on state. The electrodes may be used in conjunction with 50% "y" branch circuits, which also have good, stable extinction and power balance characteristics with a minimum of temperature, wavelength, or temporal instability.

Both the inner Mach-Zehnder interferometer 152 and the outer Mach-Zehnder interferometer 154 may be formed from X-cut or Z-cut lithium niobate. Also, both the inner Mach-Zehnder interferometer 152 and the outer Mach-Zehnder interferometer 154 may be velocity matched or temperature compensated interferometers. In addition, both interferometers may be narrow band interferometers. Using narrow band interferometers is useful for optimizing the efficiency of the pulse generator.

Specifically, the pulse generator 150 includes an input waveguide 160 that is split into a first 162 and a second waveguide 164 of the outer Mach-Zehnder interferometer 154 at a first junction 163. The first waveguide 162 is optically coupled to an input 165 of the inner Mach-Zehnder interferometer 152. The first waveguide 162 is split into an inner first 166 and an inner second waveguide 168 at a second junction 167. The inner first 166 and inner second waveguide 168 are then recombined at a third junction 170 to form an output waveguide 172 of the inner Mach-Zehnder interferometer 152. The output waveguide 172 is combined with the second waveguide, 164 at a fourth junction 174 to form an output waveguide 175 of the outer Mach-Zehnder interferometer 154.

In operation, an input optical signal propagates down the input waveguide 160, and then splits into a first and a second optical signal at the first junction 163. The first and second optical signals propagate in the outer first 162 and outer second waveguide 164, respectively. In one embodiment, the first and second optical signals each have an intensity that is approximately one half the intensity of the input optical signal.

The first optical signal then propagates through the inner Mach-Zehnder interferometer 152. The first optical signal is split into a first inner and a second inner optical signal at the second junction 167. The first and second inner optical signals propagate in the inner first 166 and inner second waveguide 168, respectively. The inner Mach-Zehnder interferometer 152 modulates at least one of the phase or amplitude of the first inner optical signal with a modulation signal applied to the Phi control voltage electrode 156. The modulation signal may be a sinusoid or a predetermined waveform.

The modulated first inner optical signal is combined with the second inner optical signal at the third junction 170 to produce an inner interferometer output, which can be modulated from on to off. The resulting inner interferometer output is combined with the second optical signal at the fourth junction 174 to produce an outer interferometer output. The second optical signal is modulated with a modulation signal applied to the Theta or bias control voltage electrode 158. The outer interferometer output signal is a composite signal that can vary in intensity from on to off.

The transfer function for the embodiment of the pulse generator of FIG. 3 with N=2 can be represented by Equation 1 as follows:

$$E = \left(\frac{e^{j\theta/2} + e^{-j\theta/2}}{2}\right)^2 = \cos^2\left(\frac{\theta}{2}\right) \quad (4)$$

$$= \frac{1}{2} + \frac{1}{2}\left(\frac{e^{j\theta} + e^{-j\theta}}{2}\right) = \frac{1}{2} + \frac{1}{2}\cos(\theta)$$

The inner Mach-Zehnder interferometer 152 is represented by the ½ cos(θ) term and the waveguide 164 having the bias electrode 158 is represented by the constant ½ term. In this embodiment, the bias electrode 158 is used to align the phase of waveguide 164 with that of the inner Mach-Zehnder interferometer 152.

The output intensity of the pulse generator of FIG. 3 can be described by the following equation:

$$I = E^2 = [½ + ½\cos(\theta)]^2 \quad (5)$$

For an embodiment of the N=2 pulse generator where the splitting ratio between outer first waveguide 162 and outer second waveguide 164 is variable, the intensity equation has the following form:

$$Io2c\,(\phi,F,\theta) := (F \cdot \cos(\theta) + (1-F) \cdot \cos(\phi))^2 = F^2 \cdot \sin(\theta)^2 \quad (6)$$

where F is the splitting ratio between E1' and E2', Theta is the phase angle of the E2' leg relative to the "inner" Mach-Zehnder output, and Phi is the phase angle of the inner Mach-Zehnder, impressed with the applied voltage.

In one embodiment the splitting ratio is 50%. In another embodiment, the splitting ratio is chosen to be more than 50%, to produce a second order maxima in the transfer function. In this embodiment, the required modulation voltage is reduced and the width of the intensity off region is increased.

Figure 4:
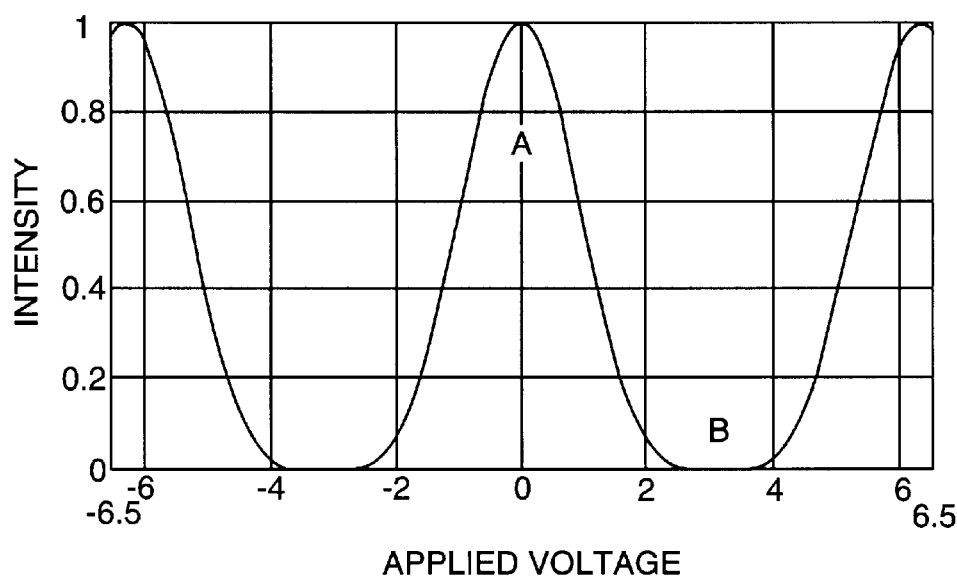
FIG. 4 illustrates a transfer function between the applied modulation signal and the output intensity of one embodiment of the narrow pulse generator of the present invention.

FIG. 4 illustrates a transfer function between the applied modulation signal and the output intensity of the narrow pulse generator of FIG. 3. The narrow pulse generator has a "redoubled" transfer function between the applied modulation signal and the output intensity. Domain points A and B represent points along the transfer function such that the modulator is biased fully on or fully off. This corresponds with physically biasing the inner Mach-Zehnder interferometer 152 and outer Mach-Zehnder interferometer 154 in-phase or out-of-phase, respectfully. In order to generate a symmetric, well-behaved pulse train, the modulator should be biased at one of these domain points. Modulation about either of these domain points will produce well-behaved non-symmetric pulses. Also, the voltage between the two domain points will be twice the voltage required to turn the inner Mach-Zehnder interferometer 152 on and off. This voltage is referred in the art as V-pi and modulator drive voltages are typically in units of V-pi.

Figure 5:
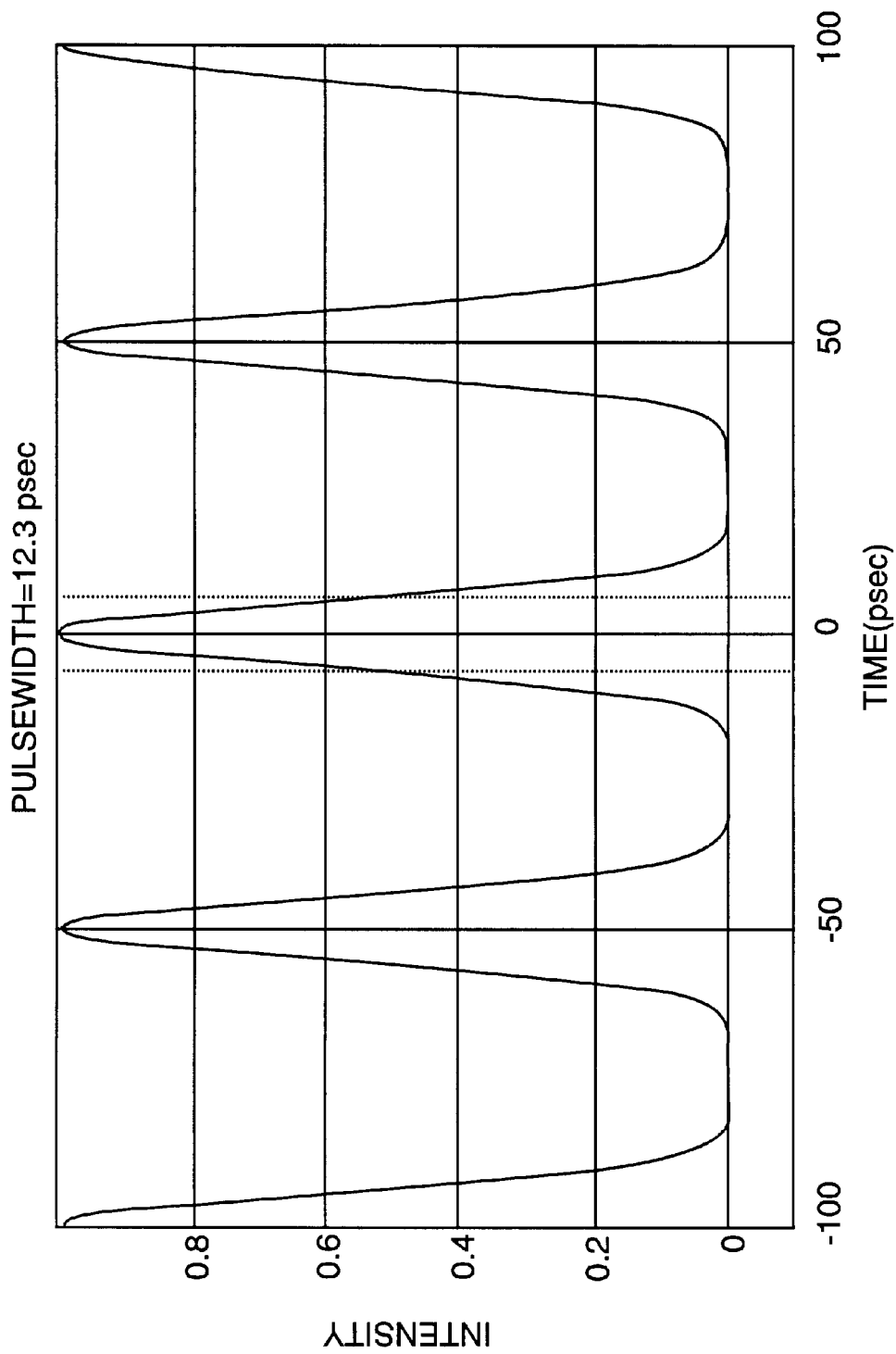
FIG. 5 illustrates a time domain output of one embodiment of the narrow pulse generator of the present invention with the generator being biased at an intensity maximum and having an input sinusoidal modulation signal.

FIG. 5 illustrates a time domain output of one embodiment of the pulse generator of the present invention with the generator being biased at an intensity maximum and having an input sinusoidal modulation signal of 10 GHz. The resulting output signal has a pulse width that is approximately 12 picoseconds, with a repetition rate of approximately 20 GHz.

In one embodiment of the present invention, the transfer function is swept when the generator is biased at an intensity maximum, thereby doubling the output frequency, as described in connection with FIG. 2c. When the input optical signal is symmetrical about an intensity maximum, two intensity pulses are generated for every cycle of the to input signal, hence frequency doubling the pulse rate of the optical output, with respect to the modulation signal.

For the embodiment illustrated in FIG. 3, the input frequency is 10 GHz, which when doubled, produces a 20 GHz optical clock frequency. Also, for the embodiment shown in FIG. 5, the pulse width facilitates splitting and recombining, to produce 12.5 picosecond pulses, which can be used for 40 Gb/s data transmission.

In another embodiment of the invention, the narrow pulse generator comprises a plurality of inner Mach-Zehnder interferometers in a "nested" structure. The nested structure can have any number of inner Mach-Zehnder interferometers in order to achieve the desired output intensity characteristics. For example, for order N=3, Equation 1 can be expressed as:

$$E = \left(\frac{e^{j\theta/2} + e^{-j\theta/2}}{2}\right)^3 = \cos^3\left(\frac{\theta}{2}\right) \quad (7)$$

$$= \frac{1}{4}\left(\frac{e^{j3\theta/2} + e^{-j3\theta/2}}{2}\right) + \frac{3}{4}\left(\frac{e^{j\theta/2} + e^{-j\theta/2}}{2}\right)$$

$$= \frac{1}{4}\cos\left(\frac{3\theta}{2}\right) + \frac{3}{4}\cos\left(\frac{\theta}{2}\right)$$

Figure 6:
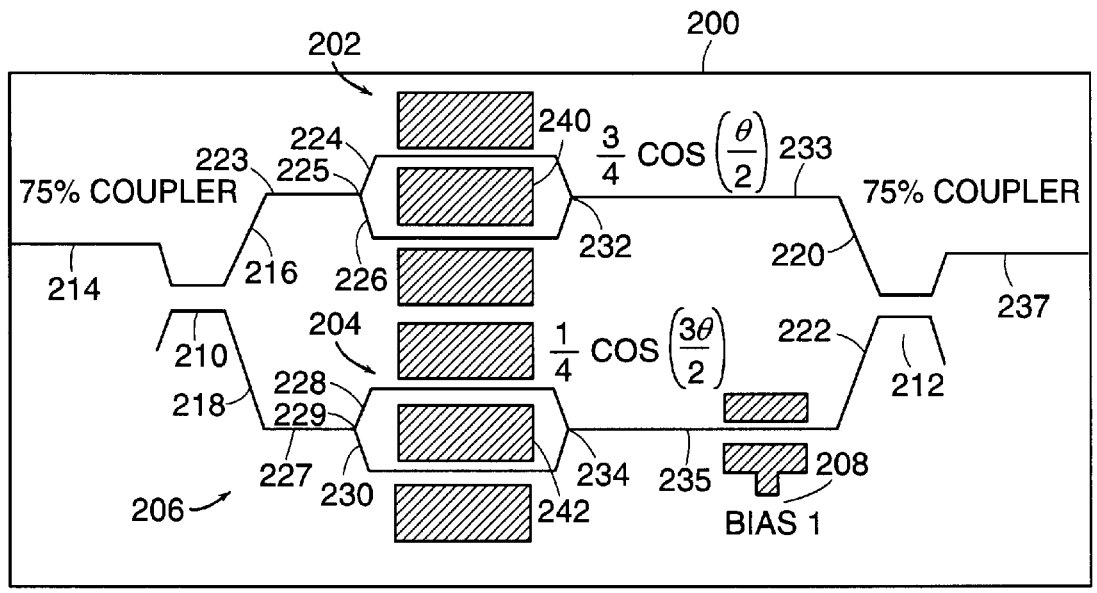
FIG. 6 illustrates an embodiment of a narrow pulse generator using a nested modulator configuration of order N=3 according to the present invention.

FIG. 6 illustrates a pulse generator 200 of the present invention having order N=3. The first inner Mach-Zehnder interferometer 202 represents the ¾ cos (θ/2) term and the second inner Mach-Zehnder interferometer 204 represents the ¼ cos (3 θ/2) term in Equation 7. The pulse generator 200 includes the two inner Mach-Zehnder interferometers 202 and 204, and an outer Mach-Zehnder interferometer 206. The outer Mach-Zehnder interferometer 206 also includes a bias electrode 208 for applying a modulation signal.

In one embodiment, electrodes are used to control the static optical phase of the relative arms of the first inner Mach-Zehnder interferometer 202, the second inner Mach-Zehnder interferometer 204, and the outer Mach-Zehnder interferometer 206. The electrodes can change the amplitude of the light in the waveguide by causing a predetermined amount of excess optical loss due to loading of the optical signal by the metal. The loading occurs when the tail of the optical beam in the waveguide comes in contact with the metal electrode. This loading generally occurs when there is no dielectric material (referred to as a buffer layer) between the metal and the edges of the waveguide.

In one embodiment, the electrodes 240 and 242 of Mach-Zehnder interferometers 202 and 204, respectively, and the bias electrode 208, are biased to balance or change the fraction of the light in the relative arms to produce the desired extinction in the off state and the desired light output in the on state. The electrodes in this embodiment are used in conjunction with 75% "y" branch circuits 210, 212 or couplers, which have desired extinction and power balance properties.

Both the inner Mach-Zehnder interferometers 202 and 204 and the outer Mach-Zehnder interferometer 206 may be formed from X-cut or Z-cut lithium niobate. Also, both the inner Mach-Zehnder interferometers 202 and 204 and the outer Mach-Zehnder interferometer 206 may be velocity matched interferometers or temperature compensated interferometers. In addition, both the inner Mach-Zehnder interferometers 202 and 204 and the outer Mach-Zehnder interferometer 206 may be narrow band interferometers. Using narrow band interferometers is useful for optimizing the efficiency of the pulse generator.

Specifically, the pulse generator 200 includes an input waveguide 214 that is split into a first 216 and a second waveguide 218 of the outer Mach-Zehnder interferometer 206 at a first junction 210. Junction 210, in one embodiment, is a 75% optical coupler. The first waveguide 216 is optically coupled to a first input 223 of the first inner Mach-Zehnder interferometer 202. The first input 223 is split into a first inner first 224 and a first inner second waveguide 226 at a second junction 225. The first inner first 224 and first inner second waveguide 226 are then recombined down stream of the first inner Mach-Zehnder interferometer 202 at a third junction 232 to form a first output waveguide 233 of the first inner Mach-Zehnder interferometer 202.

The second waveguide 218 is optically coupled to a second input 227 of the second inner Mach-Zehnder interferometer 204. The second input 227 is split into a second inner first 228 and a second inner second waveguide 230 at a fourth junction 229. The second inner first 228 and the second inner second waveguide 230 are then recombined at a fifth junction 234 to form a second output waveguide 235 of the second inner Mach-Zehnder interferometer 204. The first output waveguide 233 is combined with a second output waveguide 235 at a sixth junction 212 to form an output waveguide 237 of the outer Mach-Zehnder interferometer 206. Junction 212 in one embodiment is a 75% "y" branch coupler.

In operation, an input optical signal propagates down the input waveguide 214, and then splits into a first and a second optical signal at the first junction 210. The first and second optical signals propagate in the outer first 216 and outer second waveguide 218, respectively. In one embodiment, the first and second optical signals have a splitting ratio that is approximately 75%.

The first optical signal then propagates through the first inner Mach-Zehnder interferometer 202. The first optical signal is split into a first inner and a second inner optical signal at the second junction 225. The first and second inner optical signals propagate in the first inner first 224 and first inner second waveguide 226, respectively. The first inner Mach-Zehnder interferometer 202 modulates at least one of the phase or amplitude of the first inner optical signal with a modulation signal applied to its electrode 240. The modulation signal may be a sinusoid or a predetermined waveform. The modulated first inner optical signal is combined with the second inner optical signal at the third junction 232 to produce a first inner interferometer output, which can be modulated from on to off.

The second optical signal is split into a third and fourth inner optical signal at the fourth junction 229. The third and fourth inner optical signals propagate in the second inner first 228 and the second inner second waveguide 230, respectively. The second inner Mach-Zehnder interferometer 204 modulates at least one of the phase or amplitude of the fourth inner optical signal with a modulation signal applied to its electrode 242. The modulation signal may be a sinusoid or a predetermined waveform. The modulated fourth inner optical signal is combined with the third inner optical signal at the fifth junction 234 to produce a second inner interferometer output, which can be modulated from on to off.

The resulting first and second inner interferometer outputs are combined at the sixth junction 212 to produce an outer interferometer output. The second interferometric output signal is modulated with a modulation signal applied to the bias control voltage electrode 208. In one embodiment, a signal is applied to the bias electrode 208 that aligns the phase of the two inner Mach-Zehnder interferometers, thereby substantially canceling the phase shift across the couplers. The bias points of the two inner Mach-Zehnder interferometers can also be controlled relative to one another. The outer interferometer output signal is a composite signal that can vary in intensity from on to off.

Figure 7:
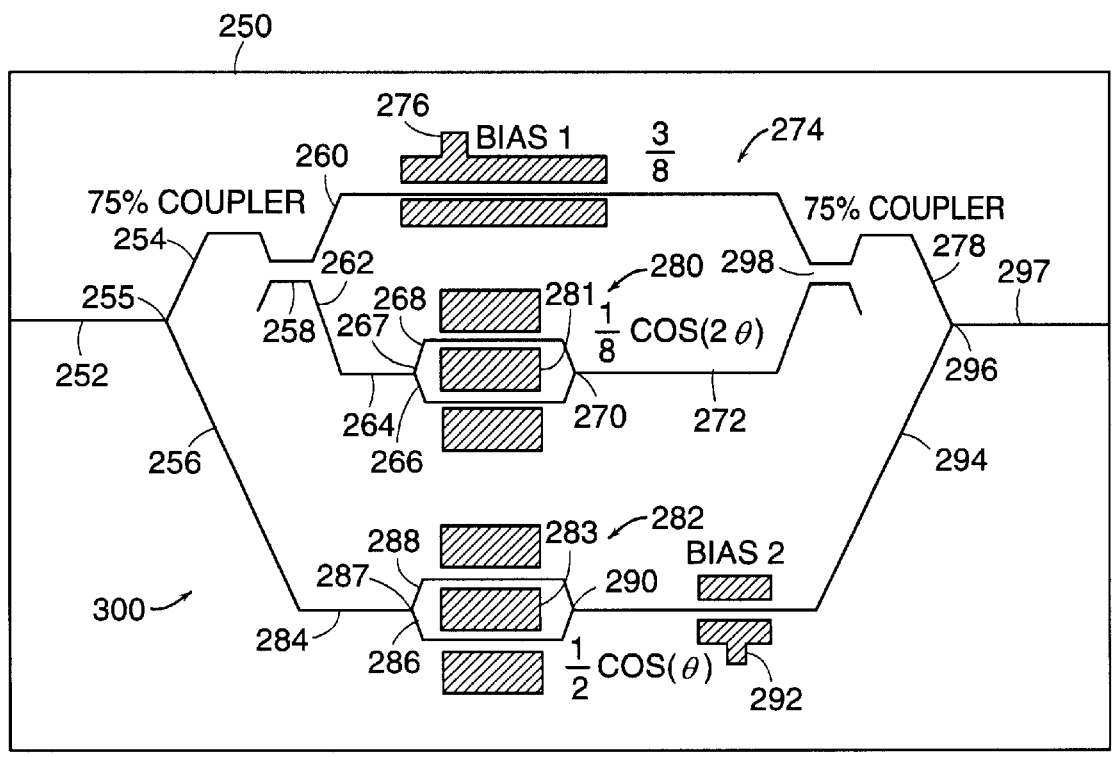
FIG. 7 illustrates an embodiment of a narrow pulse generator using a nested modulator configuration of order N=4 according to the present invention.

FIG. 7 illustrates a pulse generator 250 of the present invention having order N=4. In this embodiment, Equation 1, can be expressed as $$E = \left(\frac{e^{j\theta/2} + e^{-j\theta/2}}{2}\right)^4 = \cos^4\left(\frac{\theta}{2}\right) \quad (8)$$

$$= \frac{1}{8}\left(\frac{e^{j2\theta} + e^{-j2\theta}}{2}\right) + \frac{1}{2}\left(\frac{e^{j\theta} + e^{-j\theta}}{2}\right) + \frac{3}{8}$$

$$= \frac{1}{8}\cos(2\theta) + \frac{1}{2}\cos(\theta) + \frac{3}{8}$$

The pulse generator 250 includes three inner Mach-Zehnder interferometers 280, 282, and 274, and outer Mach-Zehnder interferometer 300. The outer Mach-Zehnder interferometer 300 also includes an inner bias electrode 276 and an outer bias electrode 292 for applying bias and modulation signals. The constant term (3/8) in Equation 8 represents the inner bias. The 1/8 cos (2θ) term represents the first inner modulator 280 and the 1/2 cos (θ) term represents the first outer Mach-Zehnder interferometer 282.

In one embodiment, electrodes are used to control the static optical phase of the relative arms of the first inner Mach-Zehnder interferometer 280, the second inner Mach-Zehnder interferometer 282, the third inner Mach-Zehnder interferometer 274, and the outer Mach-Zehnder interferometer 300. The electrodes of Mach-Zehnder interferometer 280 and 282 and the two bias electrodes 276 and 292 are also used to balance or change the fraction of the light in the relative arms to produce the desired extinction in the off state and the desired light output in the on state. The electrodes in this embodiment are used in conjunction with 75% "y" branch circuits 258, 298 or couplers, which have desired extinction and power balance properties.

The first inner Mach-Zehnder interferometer 280, the second inner Mach-Zehnder interferometer 282, the third inner Mach-Zehnder interferometer 274, and the outer Mach-Zehnder interferometer 300 may be formed from X-cut or Z-cut lithium niobate. Also, the Mach-Zehnder interferometers 280, 282, and 274 and the outer Mach-Zehnder interferometer 300 may be velocity matched interferometers or temperature compensated. The Mach-Zehnder interferometers 280, 282, and 274 may also be narrow band interferometers. Narrow band interferometers are useful for optimizing the efficiency of the pulse generator.

Specifically, the pulse generator 250 includes an input waveguide 252 that is split into a first 254 and a second waveguide 256 of outer Mach-Zehnder interferometer 300 at a first junction 255. Junction 255, in one embodiment is a balanced optical coupler. The first waveguide 254 is optically coupled to a second junction 258. In one embodiment, the second junction is a 75% "y" branch circuit. The second junction 258 comprises an input to the third inner Mach-Zehnder interferometer 274.

The first waveguide 254 is split into a first inner waveguide 262 and a second inner waveguide 260. The first inner waveguide 262 is optically coupled to input 264 of first inner Mach-Zehnder interferometer 280. The first inner waveguide 264 is split into a first inner first 268 and a first inner second waveguide 266 at a third junction 267. The first inner first 268 and first inner second waveguide 266 are then recombined at a fourth junction 270 to form a first inner output waveguide 272 of the first inner Mach-Zehnder interferometer 280. The second inner waveguide 260 and the first inner output waveguide 272 are optically coupled to a fifth junction 298. In one embodiment, the fifth junction comprises a 75% "y" branch circuit. First outer output waveguide 278 is optically coupled to the output of fifth junction 298.

The second waveguide 256 is optically coupled to input 284 of second inner Mach-Zehnder interferometer 282. The input 284 is split into a second inner first waveguide 288 and a second inner second waveguide 286 at a sixth junction 287. The second inner first 288 and the second inner second waveguide 286 are then recombined at a seventh junction 290 to form a second output waveguide 294 of the second inner Mach-Zehnder interferometer 282. The first output waveguide 278 is combined with a second output waveguide 294 at an eighth junction 296 to form an output waveguide 297 of the outer Mach-Zehnder interferometer 300.

In operation, an input optical signal propagates down the input waveguide 252, and then splits into a first and a second optical signal at the first junction 255. The first and second optical signals propagate in the outer first 254 and outer second waveguide 256, respectively. In one embodiment, the first and second optical signals each have an intensity that is approximately one half of the intensity of the input optical signal.

The first optical signal propagates through junction 258 which splits the first optical signal into a first inner and a second inner optical signal. The second inner optical signal propagates to third junction 267 which splits the second inner optical signal into a third inner optical signal and a fourth inner optical signal. The third and fourth inner optical signals propagate in first inner second 266 and a first inner first waveguide 268, respectively. The first inner Mach-Zehnder interferometer 280 modulates at least one of the phase or amplitude of the third inner optical signal with a modulation signal applied to its electrode 281. The modulation signal may be a sinusoid or a predetermined waveform. The modulated third inner optical signal is combined with the fourth inner optical signal at the fourth junction 270 to produce a first inner interferometer output, which can be modulated from on to off. The first inner optical signal propagates through second inner waveguide 260 and is combined with the first inner interferometer output at fifth junction 298 to produce a third inner interferometer output signal. The third inner interferometer output signal is modulated with a modulation signal applied to the bias electrode 276. The third inner interferometer output signal is optically coupled through fifth junction 298 to first outer output waveguide 278 to produce a first outer interferometer output signal with can be modulated from on to off.

The second optical signal propagates through outer second waveguide 256 to the input 284 of second inner Mach-Zehnder interferometer 282, and eventually to sixth junction 287. Sixth junction 287 splits the second optical signal into a fifth inner optical signal and a sixth inner optical signal. The fifth and sixth inner optical signals propagate in second inner second 286 and a second inner first waveguide 288, respectively. The second inner Mach-Zehnder interferometer 282 modulates at least one of the phase or amplitude of the fifth inner optical signal with a modulation signal applied to its electrode 283. The modulation signal may be a sinusoid or a predetermined waveform. The modulated fifth inner optical signal is combined with the sixth inner optical signal at the seventh junction 290 to produce a second outer interferometer output signal, which can be modulated from on to off.

The resulting first and second outer interferometer output signals are combined at the eighth junction 296 to produce an outer interferometer output signal. The second outer interferometer output signal is modulated with a modulation signal applied to the bias control voltage electrode 292. The bias electrode 292 aligns the phase of the inner Mach-Zehnder interferometers and the second inner waveguide 260, thereby canceling the phase shift across the couplers. The bias points of the inner Mach-Zehnder interferometers can also be controlled relative to one another. The outer interferometer output signal is a composite signal that can vary in intensity from on to off.

Figure 8:
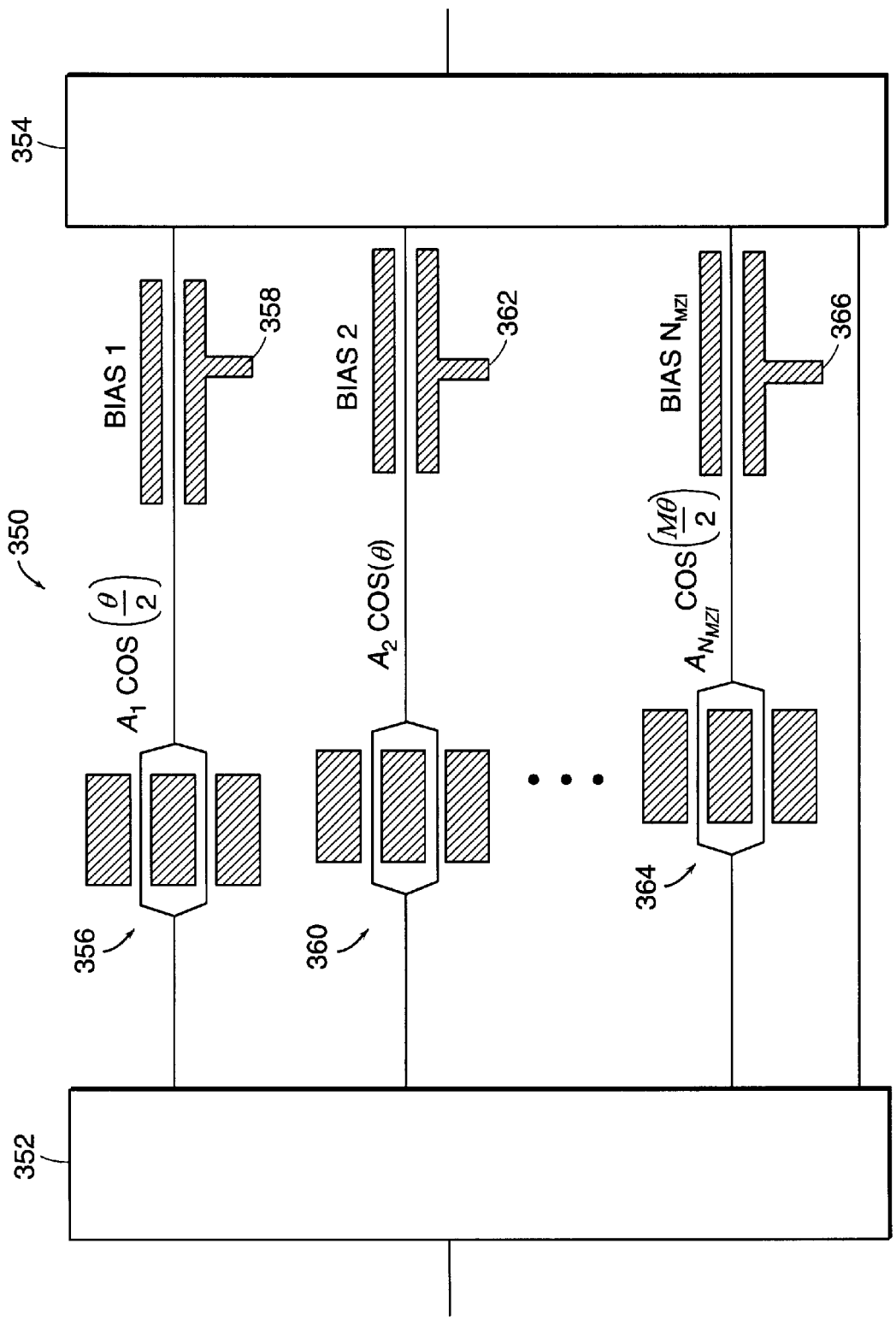
FIG. 8 illustrates a general embodiment of a narrow pulse generator using a nested modulator configuration of arbitrary order according to the present invention.

FIG. 8 illustrates a pulse generator having N nested interferometric modulators. Boxes 352 and 354 represent some combination of "y" branch circuits and couplers or other power dividing structures to achieve the desired split ratio for each branch. Numerous other passive power splitting structures known in the art, such as Multi-Mode Interference (MMI) structures, or even bulk optic power splitting arrangements, such as lensing systems can also be used.

Mach-Zehnder interferometers 356, 360, and 364 modulate the various optical signals propagating in the pulse generator 350. The bias electrodes 358, 362, and 366 align the phase of the various arms of the nested modulator. For a given order, not all multiples of $\theta/2$ show up as drive levels in the architecture. For example, order N=3 contains modulation levels $3\theta/2$ and $\theta/2$, whereas order N=4 contains levels $2\theta$ and $\theta$. In addition, the constant term representing the passive waveguide arm appears only for the even orders (i.e. N=2,4, . . . ).

Another discovery of the invention is that higher order transfer functions can also be achieved by cascading two or more lower order nested modulators. The number of cascaded nested modulators will depend on the number of modulation signals that must be applied, the strength of the required modulation, and the complexity of the bias control, which is typically controlled actively, using a feedback loop. For example, cascading two N=2 order modulators creates the same transfer function as one N=4 modulator, with both arrangements requiring two modulation signals. However, cascading four N=1 modulators to produce the same function is less practical, as four time-synchronized modulation signals must be applied, instead of two.

Figure 9:
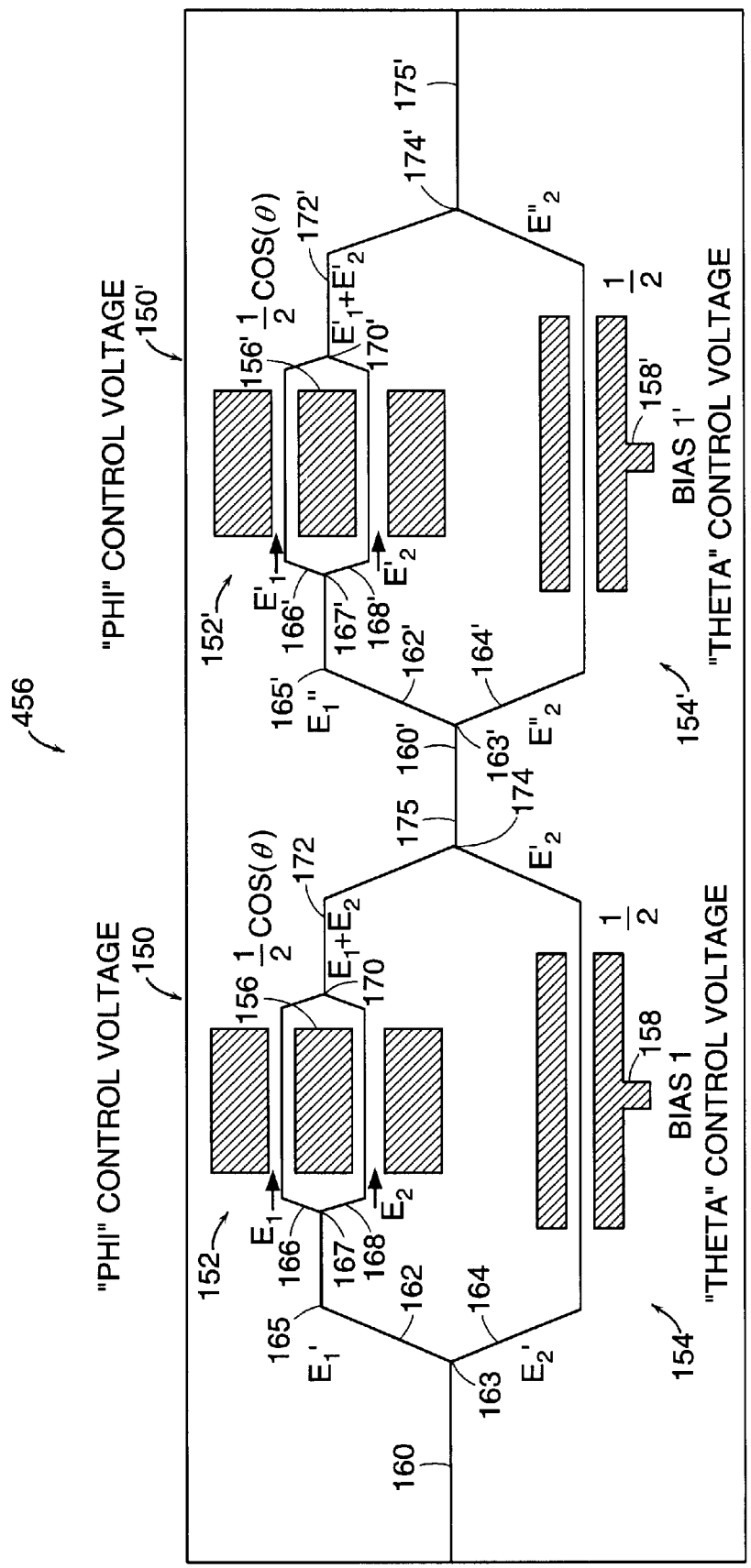
FIG. 9 illustrates an embodiment of a narrow pulse generator using a cascaded configuration of nested modulator of order N=4 according to the present invention.

FIG. 9 illustrates a cascaded configuration of two N=2 order nested modulators 456 of the present invention. This configuration has the same transfer function as an N=4 order modulator. Modulator 150 includes an inner Mach-Zehnder interferometer 152 and an outer Mach-Zehnder interferometer 154 in a nested configuration. Outer Mach-Zehnder interferometer 154 has an input waveguide 160 and an output waveguide 175. Output waveguide 175 is optically coupled to an input waveguide 160 of a second modulator 150'. Modulator 150' is identical in form and function to modulator 150, except that the input waveguide 160' of modulator 150' receives the output optical signal of modulator 150, instead of an external optical signal.

In operation, an input optical signal propagates down the input waveguide 160 of Mach-Zehnder interferometer 150. After splitting at the first junction 163, the signal propagates through Mach-Zehnder interferometer 150. The signal is then recombined at the fourth junction 174. The combined signal then enters input waveguide 160' of modulator 150' where it encounters the fifth junction 163'. After splitting at fifth junction 163', the signal propagates through MZI 150' and recombines at the eighth junction 174'. The resulting output signal corresponds to the output of an N=4 order modulator.

In one embodiment of the present invention, the modulators are chirped. That is, the frequency of the optical signals shift with the applied modulation. The equation for the transfer function for chirped operation includes a term containing a complex component, which would represent the phase shift with modulation. Combining Equation 1 with a complex term yields:

$$E = \left(\frac{e^{j\theta/2} + e^{-j\theta/2}}{2}\right)^N e^{m\theta} = \cos^N\left(\frac{\theta}{2}\right)e^{m\theta} \quad (9)$$

where the value of m depends on the strength of the chirp desired.

Figure 10:
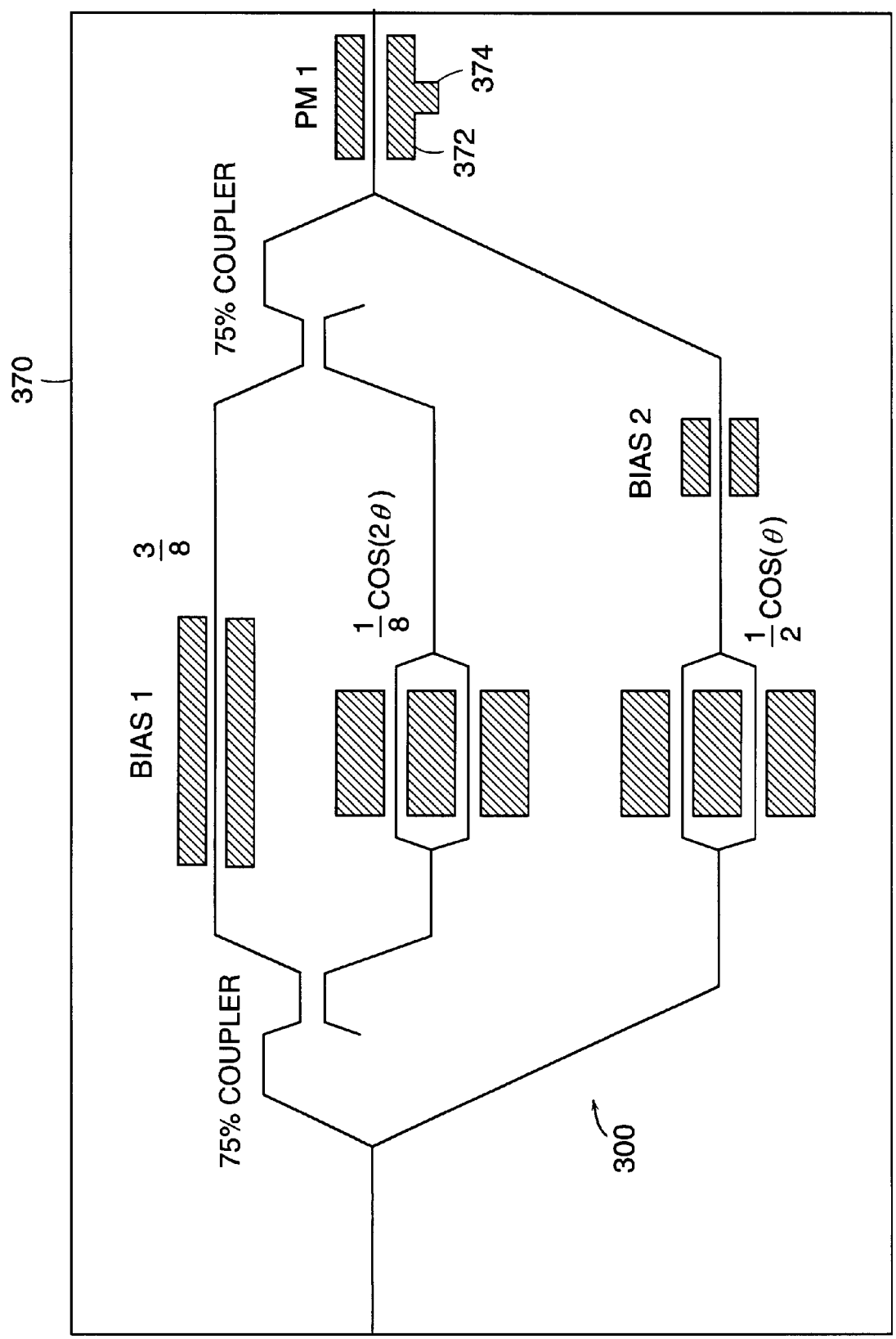
FIG. 10 illustrates an embodiment of a narrow pulse generator using a nested modulator configuration of order N=4 and a phase modulator according to the present invention.

FIG. 10 illustrates an embodiment of a chirped pulse generator 370 for order N=4. The chirped generator includes phase modulator 372 positioned in the output of outer Mach-Zehnder interferometer 300. The characteristics of the chirp are determined by applying a modulation signal to electrode 374 of phase modulator 372.

Figure 11:
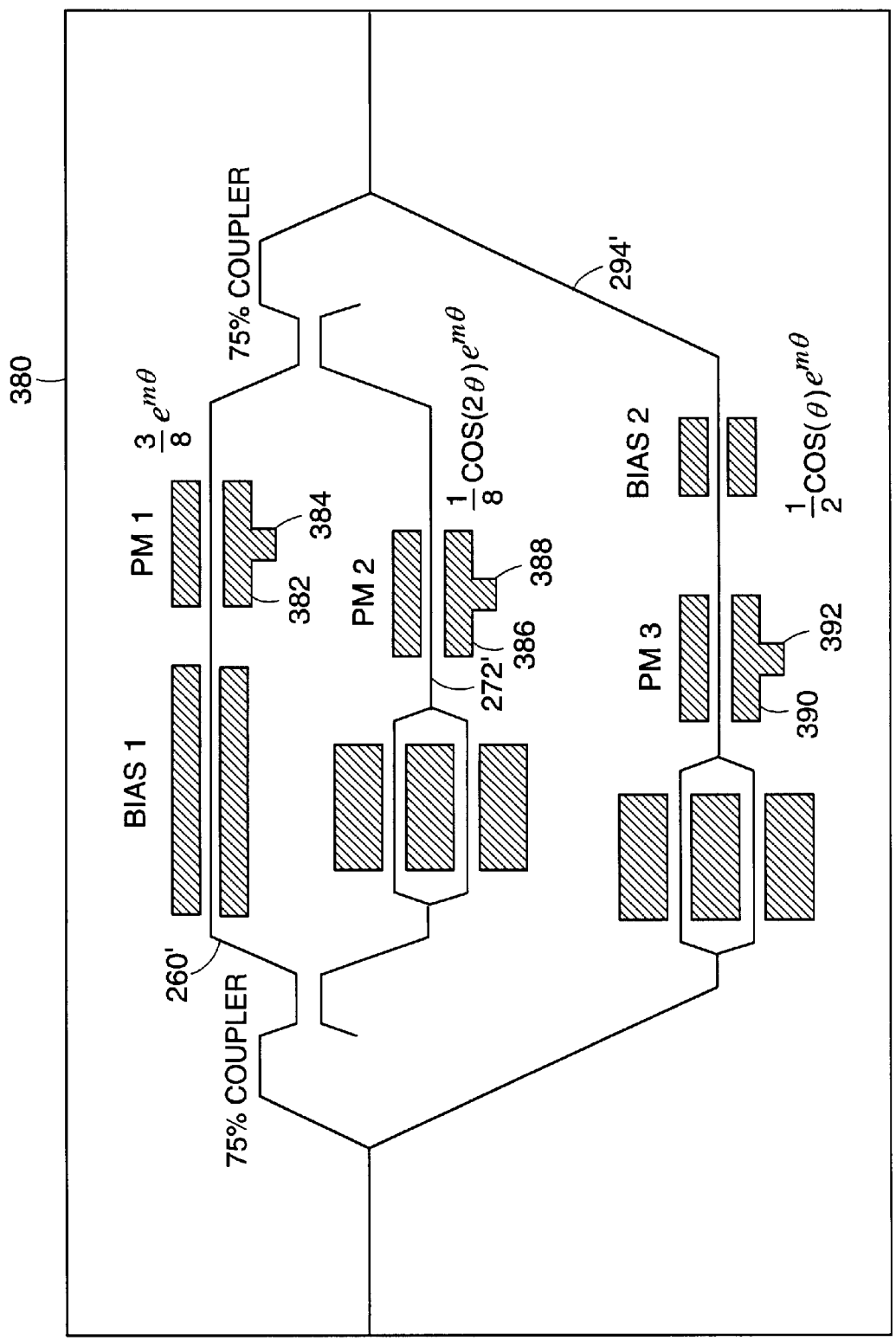
FIG. 11 illustrates an embodiment of a narrow pulse generator using a nested modulator configuration of order N=4 and multiple phase modulators according to the present invention.

FIG. 11 illustrates a chirped pulse generator 380 for order N=4. FIG. 11 also has a similar architecture to the embodiment shown in FIG. 7, except that phase modulators 382, 386, and 390 have been added to waveguides 260', 272', and 294', respectively. The chirp characteristics can be manipulated by applying modulation signals to electrodes 384, 388, and 392. The phase modulators 382, 386, and 390 in one embodiment, can induce equal amounts of phase modulation into each arm.

Figure 12:
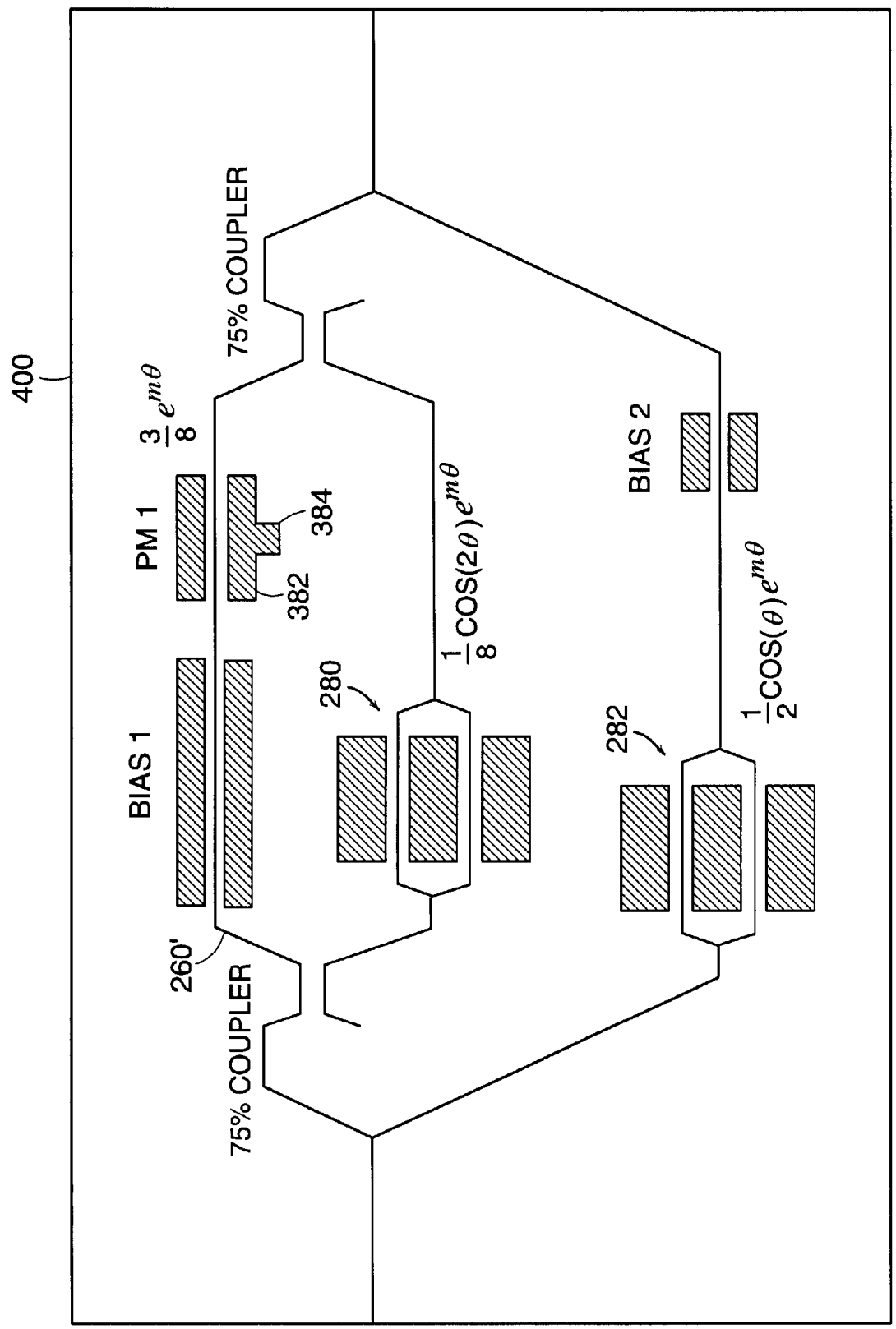
FIG. 12 illustrates an embodiment of a narrow pulse generator using a nested modulator configuration of order N=4 and a phase modulator positioned in a passive arm of a modulator according to the present invention.

FIG. 12 illustrates a pulse generator of the present invention that uses an unbalanced push-pull design in the inner Mach-Zehnder interferometers. This design integrates the phase modulation function with the amplitude modulation function. FIG. 12 has a similar architecture to the embodiment shown in FIG. 7, except that phase modulator 382 is added to waveguide 260'.

The degree of asymmetry is different in the two inner Mach-Zehnder interferometers, 280 and 282, since Mach-Zehnder interferometer 280 must be driven twice as hard as the Mach-Zehnder interferometer 282 because of the scaling required in the cos θ terms. As a result of this, the waveguide arms of Mach-Zehnder interferometer 280 also will be modulated twice as hard as the arms of Mach-Zehnder interferometer 282. However, since the net phase shift at the output of Mach-Zehnder interferometers 280 and 282 must be matched, Mach-Zehnder interferometer 280 has less asymmetry in order to compensate for the doubled drive level. One advantage of this embodiment is that all of the modulation structures are in parallel. Such a configuration results in reduced space, due to the finite length of the phase modulator electrodes.

Figure 13:
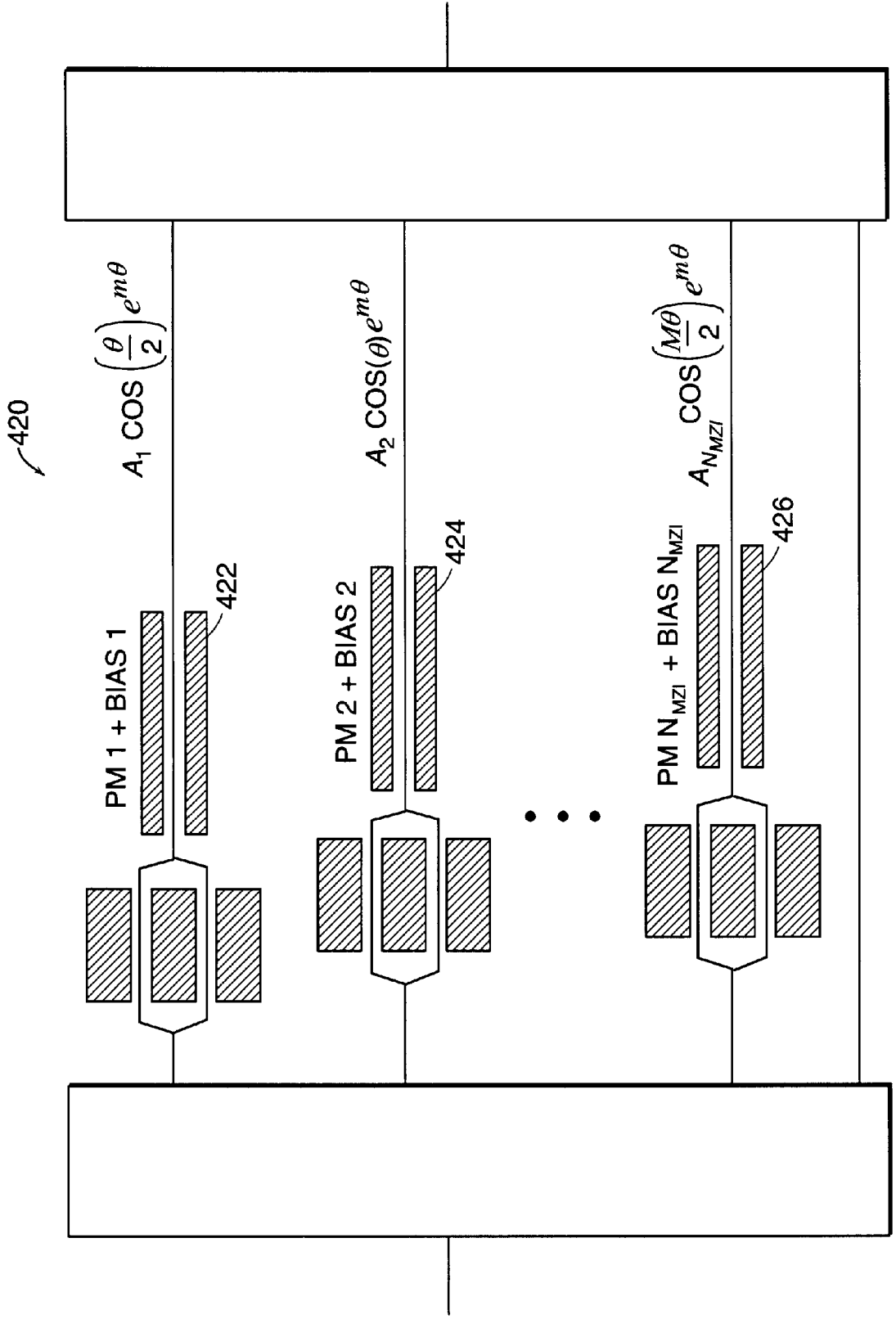
FIG. 13 illustrates a general embodiment of a narrow pulse generator using a nested modulator configuration of arbitrary order and multiple phase modulators according to the present invention.

FIG. 13 illustrates an $N^{th}$ order chirped pulse generator. The phase modulation and biasing functions are integrated into the electrodes 422, 424, and 426 as shown. Alternatively, the phase modulation and biasing electrodes can be separate electrodes. In another embodiment, asymmetrical electrodes are used for integrating phase modulation into the inner Mach-Zehnder interferometers.

The pulse generator of the present invention is particularly useful for generating narrow digital logic "RZ" pulses. The pulse generator of the present invention is also particularly useful for generating signals having a point of inflection in a desired output characteristic, such that the output transfer function has a broad region of no output intensity with respect to the controlling signal. Such signals produce an enhanced output on/off state and are advantageous for creating optimized on/off extinction.

The narrow pulse generator of the present invention may be further understood by an example of the performance of an embodiment of the present invention. The narrow pulse generator of the present invention enables the transmission of data at 40 Gb/s. The invention could be used in 1×40Gb/s (straight-40) system architectures or 2×20Gb/s systems. The pulse generator in one embodiment is intended to be used in an optical time-domain multiplexed (OTDM) system architecture.

Figure 14:
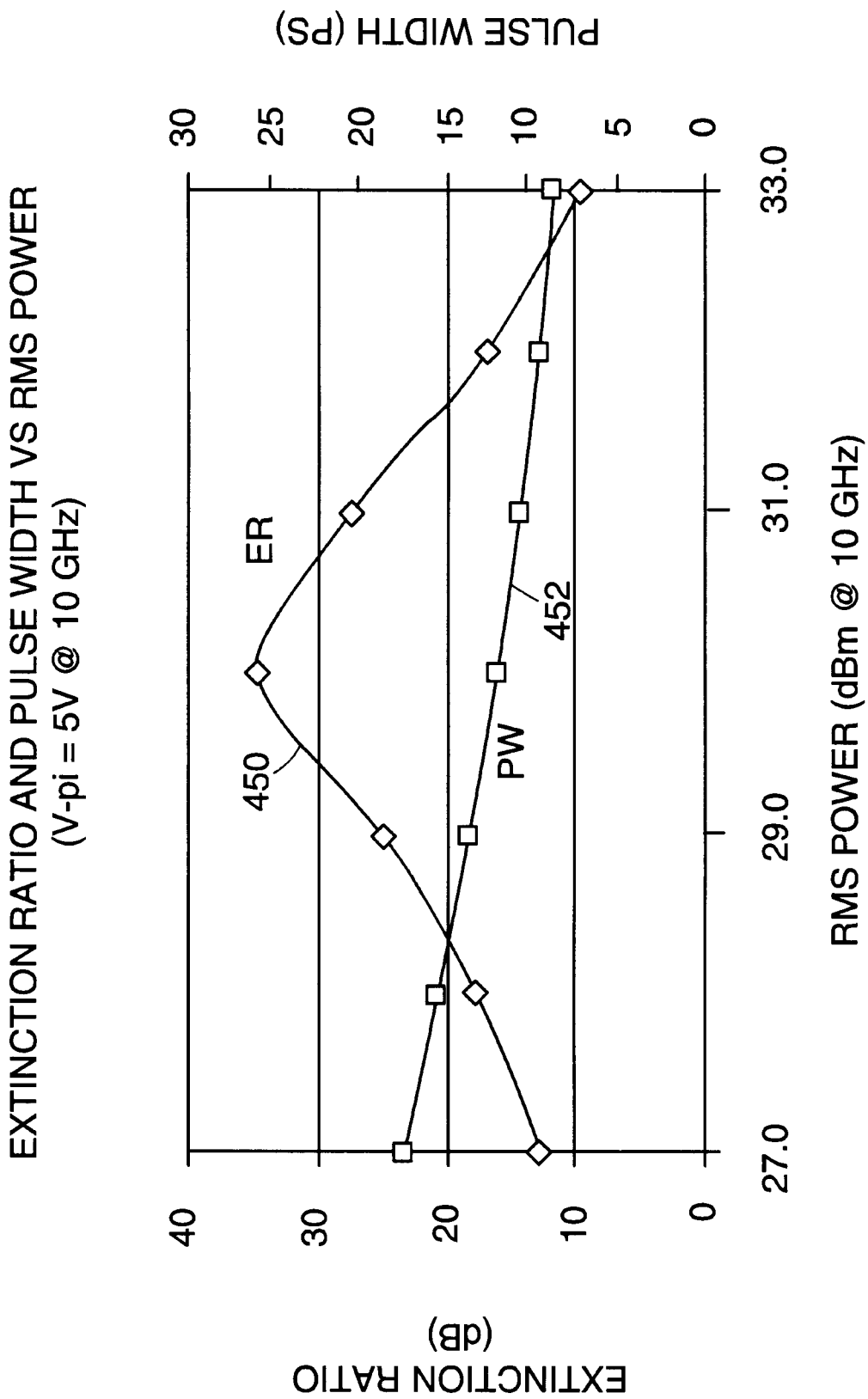
FIG. 14 illustrates the extinction ratio and pulse width as a function of drive power for an embodiment of a 2×20Gb/s pulse generator of the present invention.

FIG. 14 illustrates extinction ratio and pulse width versus RMS power for an embodiment of the present invention. As shown, a stream of 12 ps-wide (40 Gb/s pulse width) pulses separated by 50 ps (20 Gb/s pulse period) can be generated using an embodiment of the nested Mach-Zehnder device. This is accomplished by modulating around the biased ON state (Point A in FIG. 4) of the modulator using a frequency of 10 GHz and a voltage of four times V-pi. FIG. 14 illustrates both the extinction ratio 450 and the pulse width 452 as a function of RF drive power for an embodiment of the invention. The extinction ratio 450 is maximized at four times V-pi drive voltage (~30 dBm), while the pulse width is approximately 12 ps (which is 24% of the pulse repetition period, or 12ps/50ps). This embodiment requires a drive voltage of four times V-pi voltage in order to extinguish all signal in the OFF state. Inadequate drive voltage will result in a non-zero signal in the OFF state of the modulator and a broadening of the pulse but will not affect the peak optical pulse power.

Figure 16A:
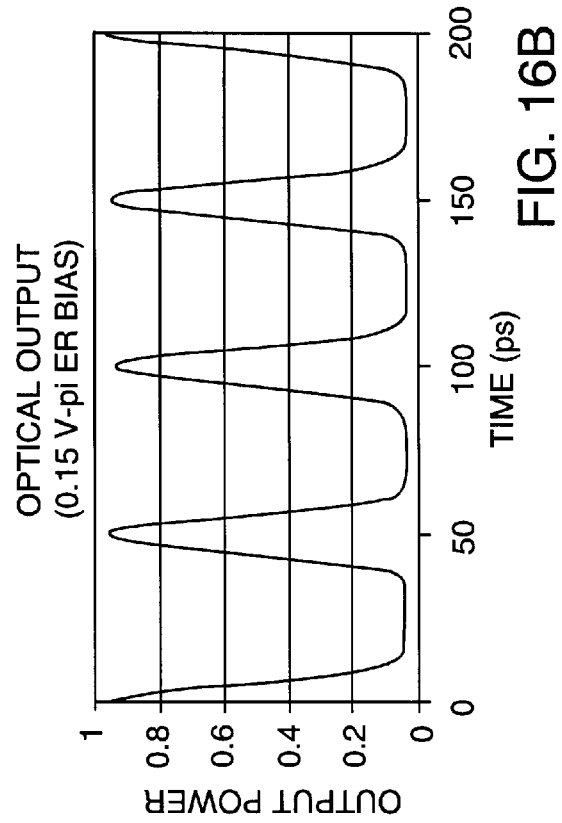
FIG. 16a illustrates the optical output generated by a 2×20Gb/s pulse generator of the present invention for a symmetrical bias equal to 0.2 V-pi.
Figure 16B:
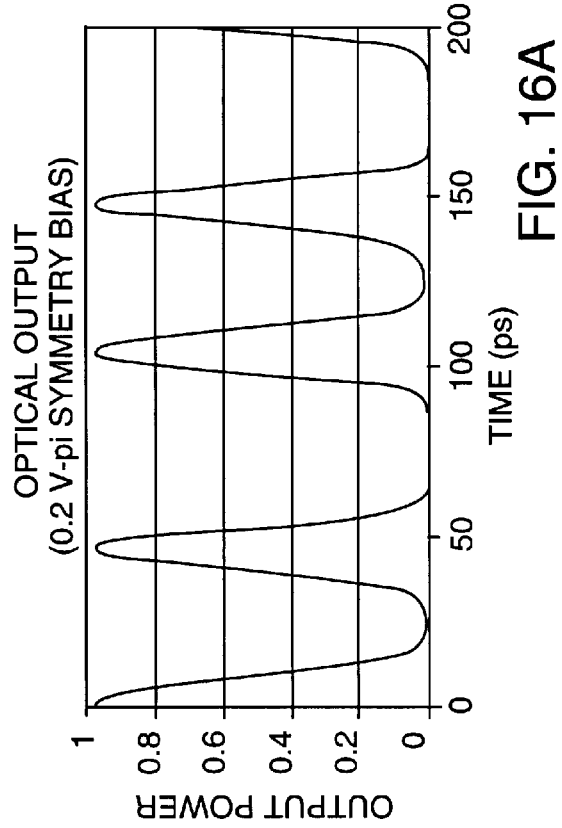
FIG. 16b illustrates optical output generated by a 2×20Gb/s pulse generator of the present invention for an extinction ratio bias equal to 0.15 V-pi.
Figure 16C:
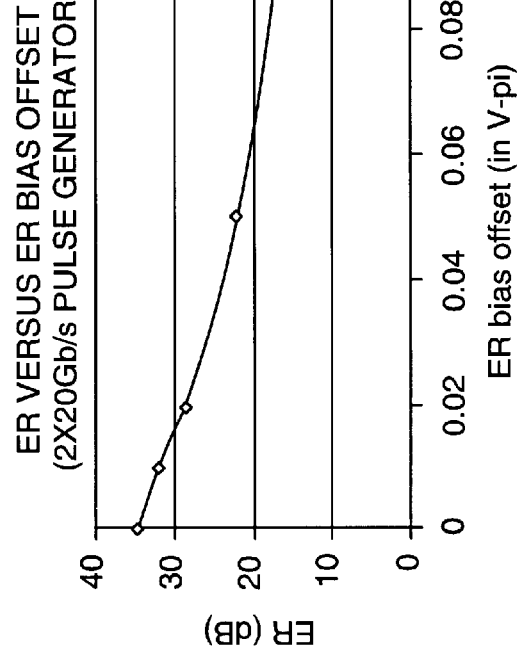
FIG. 16c illustrates extinction ratio as a function of extinction ratio bias for a 2×20Gb/s pulse generator of the present invention.

FIG. 15a and FIG. 15b illustrates a 2×20Gb/s pulse generator driven with +30 dBm and +27 dBm. In one embodiment, the nested modulator configuration of the present invention requires both the inner and outer modulators to be biased ON for optimal operation. The bias of the inner interferometer, sometimes referred to as the symmetry bias, affects the spacing of adjacent pulses as shown in FIG. 16a for a symmetrical bias offset of 0.2 V-pi. The bias of the outer interferometer affects the extinction ratio of the pulse generator and is often called the extinction ratio (ER) bias. FIG. 16b illustrates the optical output for a modulator with an offset in ER bias. FIG. 16c illustrates the extinction ratio as a function of ER bias voltage in units of V-pi. In one embodiment, bias control is achievable since optimal biasing is achieved when both the inner and outer Mach-Zehnder interferometers are biased in the ON state.

The 2×20 Gb/s pulse generator can be used to create a 1×40 Gb/s pulse stream by biasing the device in the OFF state (Point B in FIG. 4) and modulating it with a frequency of 20 GHz. Used in this mode, the effect of decreasing the drive power results in an increase in the optical loss of the device and a decrease in the optical pulse width while the extinction ratio remains relatively a function of drive power. The four times V-pi drive power of one embodiment of the pulse generator operated at a 20 GHz drive frequency is +33.6 dBm which is relatively high. However, normal operation of the device in a 1×40 Gb/s pulse mode would require the modulator to be modulated with a voltage less than four times V-pi.

Figure 17:
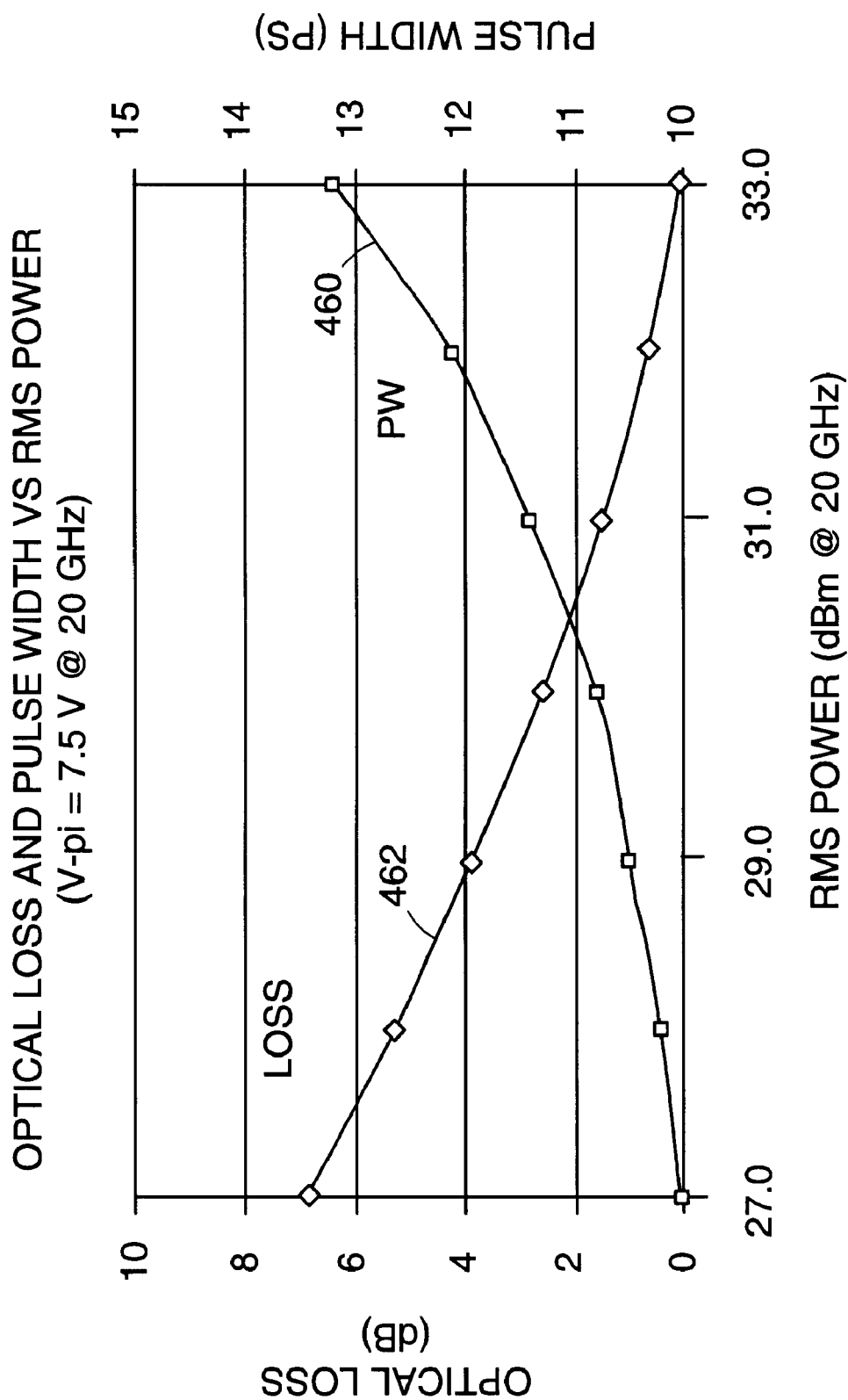
FIG. 17 illustrates optical loss and pulse width as a function of drive power for a 1×40Gb/s pulse generator of the present invention.
Figure 18B:
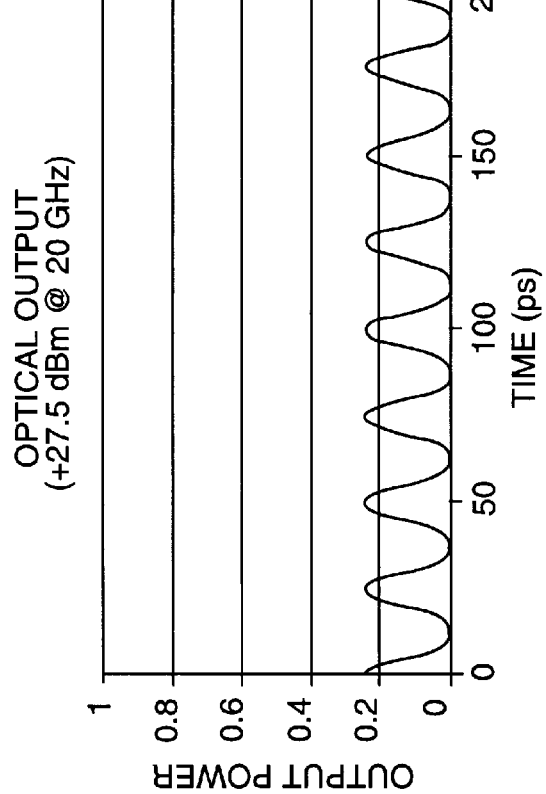
FIG. 18b illustrates the optical output generated by a 1×40Gb/s pulse generator of the present invention for a drive power equal to 27.5 dBm.
Figure 18A:
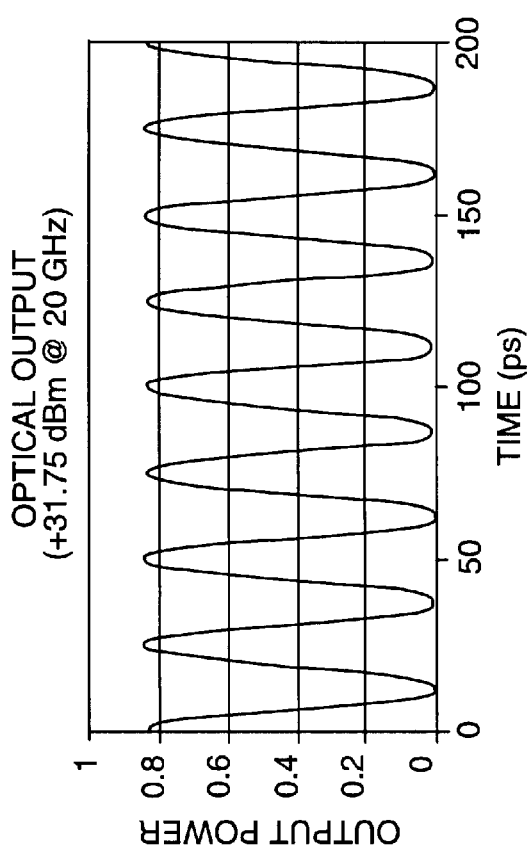
FIG. 18a illustrates the optical output generated by a 1×40Gb/s pulse generator of the present invention for a drive power equal to 31.75 dBm.

The pulse width 460 and excess optical loss 462 as a function of drive power for the 1×40 Gb/s pulse generator of one embodiment of the present invention is illustrated in FIG. 17. Twelve-picosecond-wide pulses can be achieved at a drive power of +31.75 dBm. The optical power penalty for this drive power is 0.8 dB. The corresponding pulse width and optical power penalty at +27.5 dBm are 10.1 ps and 6.0 dB, respectively. FIGS. 18a and 18b show the optical output for +31.75 dBm and +27.5 dBm input powers, respectively.

One advantage of the nested modulator configuration of the present invention for use as a 1×40 Gb/s pulse generator is that it can provide extremely short pulses of approximately 11ps–13 ps without sacrificing optical throughput. One embodiment of the present invention has less than 2 dB excess optical loss.

The pulse generators of the present invention can include an interferometric modulator having a compensation network as described in U.S. patent application Ser. No. 09/309,444 entitled, "External Optical Modulation Using Non-Co-Linear compensation Networks," which is commonly owned by the present assignee and which is incorporated herein by reference. The compensation network is electrically coupled to the electrical waveguide at a junction. The compensation network propagates the electrical signal in a second direction of propagation that is substantially non-collinear with the first direction of propagation. In one embodiment, the compensation network includes at least one of an all-pass electrical network, an inductor-capacitor "Pi" network, traveling wave coupler, filter, and transmission line transformer.

The compensation network is designed to modify at least one of the phase or the amplitude of the electrical signal at the junction relative to the phase or the amplitude of the optical signal at the junction, respectively, and then return the modified electrical signal to the electrical waveguide. The compensation network may be a time delay network or a phase delay network.

One advantage of the compensation network of the present invention is that the electrical loss per unit length can be designed to be significantly lower than the electrical loss per unit length of the electrical waveguide to minimize RF losses. Another advantage of the compensation network is that it may be removably attached to the electro-optic device so that it can be replaced by another compensation network. Another advantage of the compensation network is the temperature dependence of the compensation network can be made to be inversely proportional to the temperature dependence of the electro-optic material so as to compensate for temperature non-linearities in the electro-optic material.

In one embodiment, the compensation network is a phase delay network that modifies the phase of the electrical signal so that a phase difference between the electrical signal and the optical signal at the junction relative to the phase difference between the electrical signal and the modulation on the optical signal at an input to the optical waveguide is reduced or is substantially zero. In another embodiment, the compensation network is a phase delay network that modifies the phase of the electrical signal at the junction relative to the phase of the modulation on the optical signal at the junction by a predetermined delay that is variable over a range from zero to one hundred and eighty degrees. In this embodiment, the phase of the electrical signal at the junction relative to the phase of the modulation on the optical signal at the junction may be modified to be substantially one hundred and eighty degrees.

In operation, each of the plurality of compensation networks modifies a phase of the electrical signal at a respective junction of the plurality of junctions relative to a phase of the modulation on the optical signal at the respective junction by a predetermined delay and then returns the modified electrical signal to the electrical waveguide. The predetermined delay is variable over a range from zero to one hundred and eighty degrees and in one embodiment of the invention, the predetermined delay is substantially one hundred and eighty degrees. In another embodiment, each compensation network modifies the phase of the electrical signal at the respective junction relative to the phase of the modulation on the optical signal at the respective junction so that the electrical signal is substantially in-phase with the modulation on the optical signal at each of the plurality of junctions.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An optical pulse generator having a high order transfer function, the pulse generator comprising:

a) a first interferometric modulator comprising an optical input, an electrical input, a first arm, a second arm and an optical output; and b) a second interferometric modulator comprising an optical input, an electrical input, a first arm, a second arm and an optical output, the second interferometric modulator being optically coupled into the second arm of the first interferometric modulator, wherein the optical output of the first interferometric modulator generates pulses at a repetition rate that is proportional to a multiple of a frequency of an electrical signal applied to the electrical input of at least one of the first and second interferometric modulator and at a duty cycle that is inversely proportional to the order of the transfer function of the optical pulse generator.

2. The optical pulse generator of claim 1 further comprising:

a) a third interferometric modulator having an input optically coupled to the output of the first interferometric modulator, the third interferometric modulator comprising a first and second arm and an electrical input; and b) a fourth interferometric modulator comprising a first and second arm and an electrical input, the fourth interferometric modulator being optically coupled into the second arm of the third interferometric modulator, wherein the optical output of the third interferometric modulator generates pulses at a repetition rate that is proportional to a multiple of a frequency of an electrical signal applied to the electrical input of at least one of the second and the fourth interferometric modulator and at a duty cycle that is inversely proportional to the order of the transfer function of the optical pulse generator.

3. The optical pulse generator of claim 1 wherein at least one of the first and second interferometric modulator modulates a phase of the optical pulses.

4. The optical pulse generator of claim 1 wherein at least one of the first and second interferometric modulator modulates an amplitude of the optical pulses.

5. The optical pulse generator of claim 1 wherein at least one of the first and second interferometric modulators comprises a Mach-Zehnder modulator.

6. The optical pulse generator of claim 1 wherein a substrate forming at least one of the first and second interferometric modulators comprises a lithium niobate substrate.

7. The optical pulse generator of claim 6 wherein the lithium niobate substrate is X-cut.

8. The optical pulse generator of claim 6 wherein the lithium niobate substrate is Z-cut.

9. The optical pulse generator of claim 1 wherein at least one of the first and the second interferometric modulator is substantially velocity matched.

10. The optical pulse generator of claim 1 wherein at least one of the first and the second interferometric modulator is substantially temperature compensated.

11. The optical pulse generator of claim 1 wherein at least one of the first and the second interferometric modulator has a bandwidth that is substantially limited to a predetermined bandwidth in order to increase an efficiency of the modulation of the optical signal.

12. The optical pulse generator of claim 1 wherein a splitting ratio between the first and the second arm of at least one of the first interferometric modulator and the second interferometric modulator is substantially less than one.

13. The optical pulse generator of claim 1 further comprising a phase modulator coupled in series with the output of the first interferometric modulator, the phase modulator chirping the optical pulses with a modulation signal applied to an electrical input of the phase modulator.

14. A method for generating optical pulses with a high order nested interferometric modulator, the method comprising:
 a) receiving an input optical beam;
 b) splitting the input optical beam into a first and second optical beam;
 c) electro-optically biasing a material propagating the first optical beam thereby changing a characteristic of the first optical beam;
 d) splitting the second optical beam into a third and fourth optical beam;
 e) electro-optically biasing a material propagating at least one of the third and the fourth optical beams thereby changing a characteristic of at least one of the third and the fourth optical beams;
 f) modulating at least one of the third and fourth optical beams with an electrical signal; and
 g) interfering the first, third, and fourth optical beams to generate optical pulses having a repetition rate that is proportional to a multiple of a frequency of the electrical modulation signal and having a duty cycle that is inversely proportional to the order of the nested interferometric modulator.

15. The method of claim 14 wherein the step of electro-optically biasing a material propagating the first optical beam comprises adjusting a bias voltage so that the optical pulses have a predetermined extinction ratio.

16. The method of claim 14 further comprising the step of adjusting a splitting ratio of at least one of the input optical beam and the second optical beam so that the optical pulses have a predetermined extinction ratio.

17. The method of claim 14 wherein the electrical signal comprises a sinusoidal waveform signal.

18. The method of claim 14 wherein the electrical signal comprises a signal having a waveform that modulates at least one of the third and fourth optical beams so that the optical pulses comprises a soliton waveform.

19. The method of claim 14 wherein the electrical signal that modulates at least one of the third and fourth optical signals comprises a signal that is symmetrical about an intensity maximum.

20. A method of generating return-to-zero pulses, the method comprising:
 a. receiving an input optical beam;
 b. splitting the input optical beam into a first and second optical beam;
 c. electro-optically biasing a material propagating the first optical beam thereby changing a characteristic of the first optical beam;
 d. splitting the second optical beam into a third and fourth optical beam;
 e. electro-optically biasing a material propagating at least one of the third and the fourth optical beams thereby changing a characteristic of at least one of the third and the fourth optical beams;
 f. modulating at least one of the third and fourth optical beams with an electrical signal; and
  interfering the first, third, and fourth optical beams to generate return-to-zero pulse having a frequency that is a multiple of a frequency of the electrical modulation signal.

* * * * *

UNITED STATES PATENT AND TRADEMARK OFFICE
CERTIFICATE OF CORRECTION

PATENT NO. : 6,341,031 B1
DATED : January 22, 2002
INVENTOR(S) : Gregory J. McBrien et al.

It is certified that error appears in the above-identified patent and that said Letters Patent is hereby corrected as shown below:

<u>Column 18,</u>
Line 47, replace "interfering" with -- g) interfering --

Signed and Sealed this

Twenty-third Day of April, 2002

Attest:

Attesting Officer

JAMES E. ROGAN
*Director of the United States Patent and Trademark Office*